(12) United States Patent
Novotny

(10) Patent No.: US 6,950,570 B1
(45) Date of Patent: Sep. 27, 2005

(54) INTEGRATED FIBER, SENSOR AND LENS ARRAYS FOR OPTICAL NETWORKS

(75) Inventor: Vlad Novotny, Los Gatos, CA (US)

(73) Assignee: Active Optical Networks, Inc., Fremont, CA (US)

( * ) Notice: Subject to any disclaimer, the term of this patent is extended or adjusted under 35 U.S.C. 154(b) by 118 days.

(21) Appl. No.: 10/384,150

(22) Filed: Mar. 6, 2003

Related U.S. Application Data

(60) Provisional application No. 60/403,259, filed on Aug. 13, 2002.

(51) Int. Cl.[7] ............................................. G02B 6/26
(52) U.S. Cl. .............................. 385/18; 385/16; 385/52
(58) Field of Search .............................. 385/18, 14, 15, 385/16, 17, 25, 27, 31, 33, 39, 40, 47, 52

(56) References Cited

U.S. PATENT DOCUMENTS

| | | | | |
|---|---|---|---|---|
| 5,841,917 A | * | 11/1998 | Jungerman et al. | 385/17 |
| 6,172,817 B1 | * | 1/2001 | Senapati et al. | 359/654 |
| 6,430,331 B1 | * | 8/2002 | Hagelin et al. | 385/17 |
| 6,542,665 B2 | * | 4/2003 | Reed et al. | 385/34 |
| 6,549,691 B1 | * | 4/2003 | Street et al. | 385/18 |
| 6,580,846 B1 | | 6/2003 | Burroughs et al. | 385/16 |
| 6,628,857 B1 | * | 9/2003 | Bonadeo et al. | 385/18 |
| 6,697,547 B2 | * | 2/2004 | Walter et al. | 385/16 |
| 6,707,594 B2 | * | 3/2004 | Holmes | 359/291 |
| 6,760,505 B1 | * | 7/2004 | Street et al. | 385/18 |
| 2002/0005976 A1 | | 1/2002 | Behin et al. | |

* cited by examiner

*Primary Examiner*—Kianni Kaveh
(74) *Attorney, Agent, or Firm*—Silicon Edge Law Group LLP; Arthur J. Behiel

(57) ABSTRACT

Fiber, lens and sensor arrays and their precision alignment for optical devices with free space light propagation is disclosed Fabrication methods of arrays and their assembly are also proposed. In one implementation, a device includes a fiber alignment module holding fibers in parallel to form a fiber array. The fiber alignment module includes first and second alignment plates, and a spacer plate engaged between the first and the second alignment plates. Each alignment plate includes an array of through holes to respectively hold the fibers. A lens array can be engaged to the fiber alignment module to align lenses to their corresponding fibers. Passive alignment features may be formed at interfacing surfaces of different layers to assist the alignment. Applications of these integrated fiber, lens and sensor arrays to optical cross connect switches and reconfigurable add drop multiplexers are also disclosed.

30 Claims, 28 Drawing Sheets

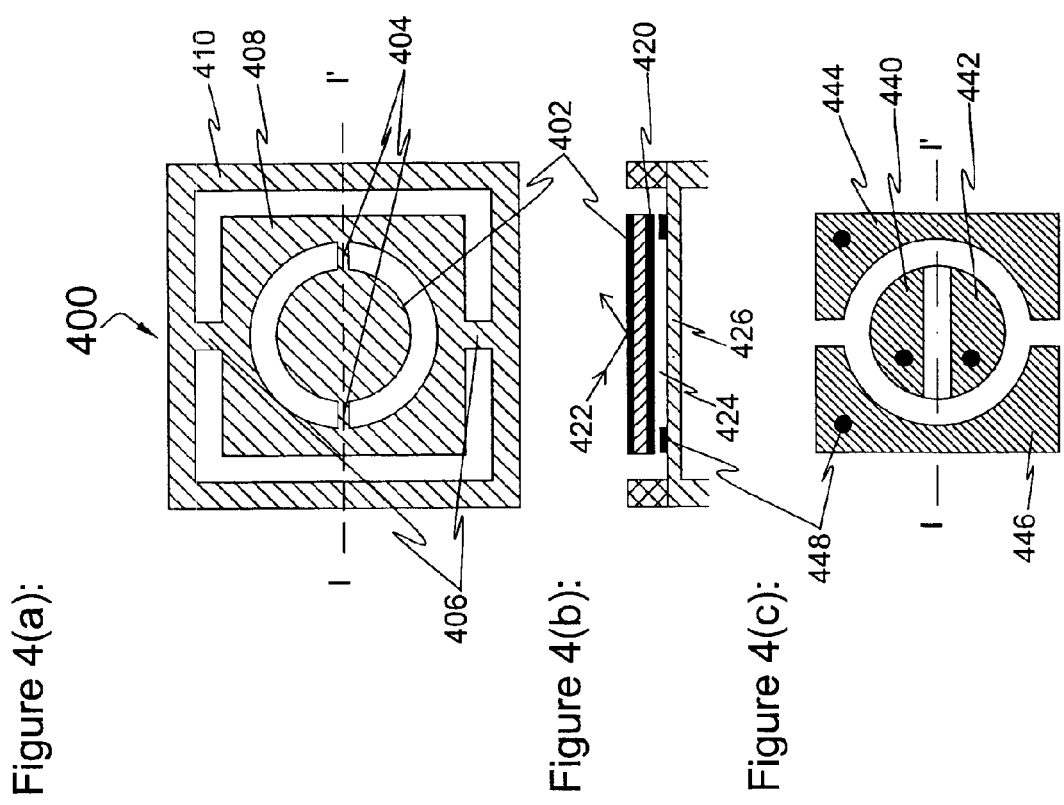

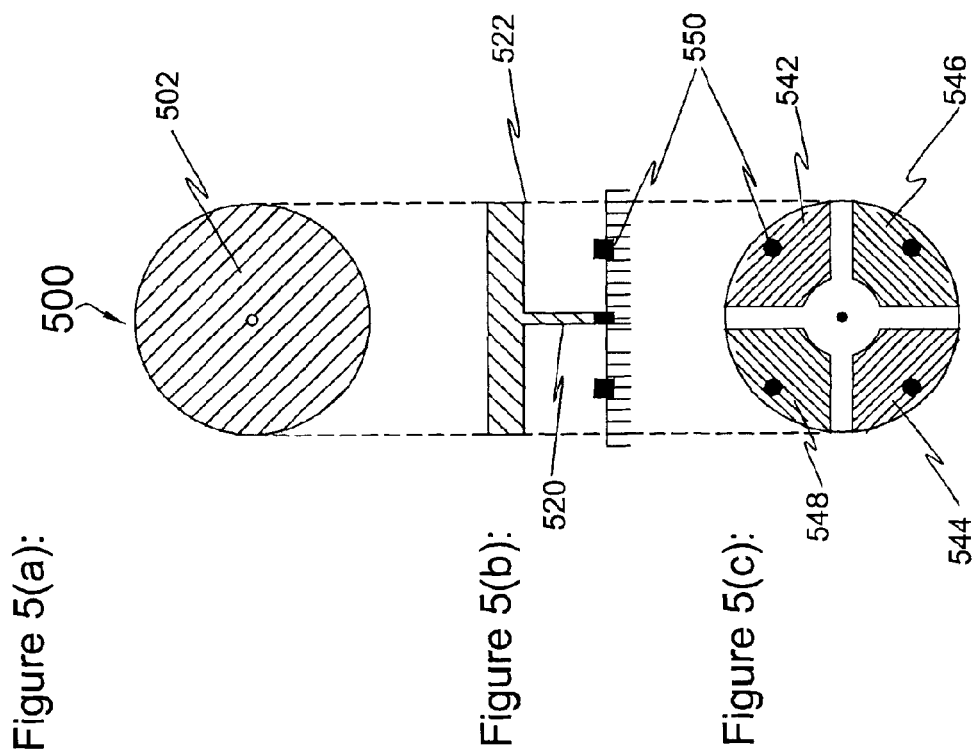

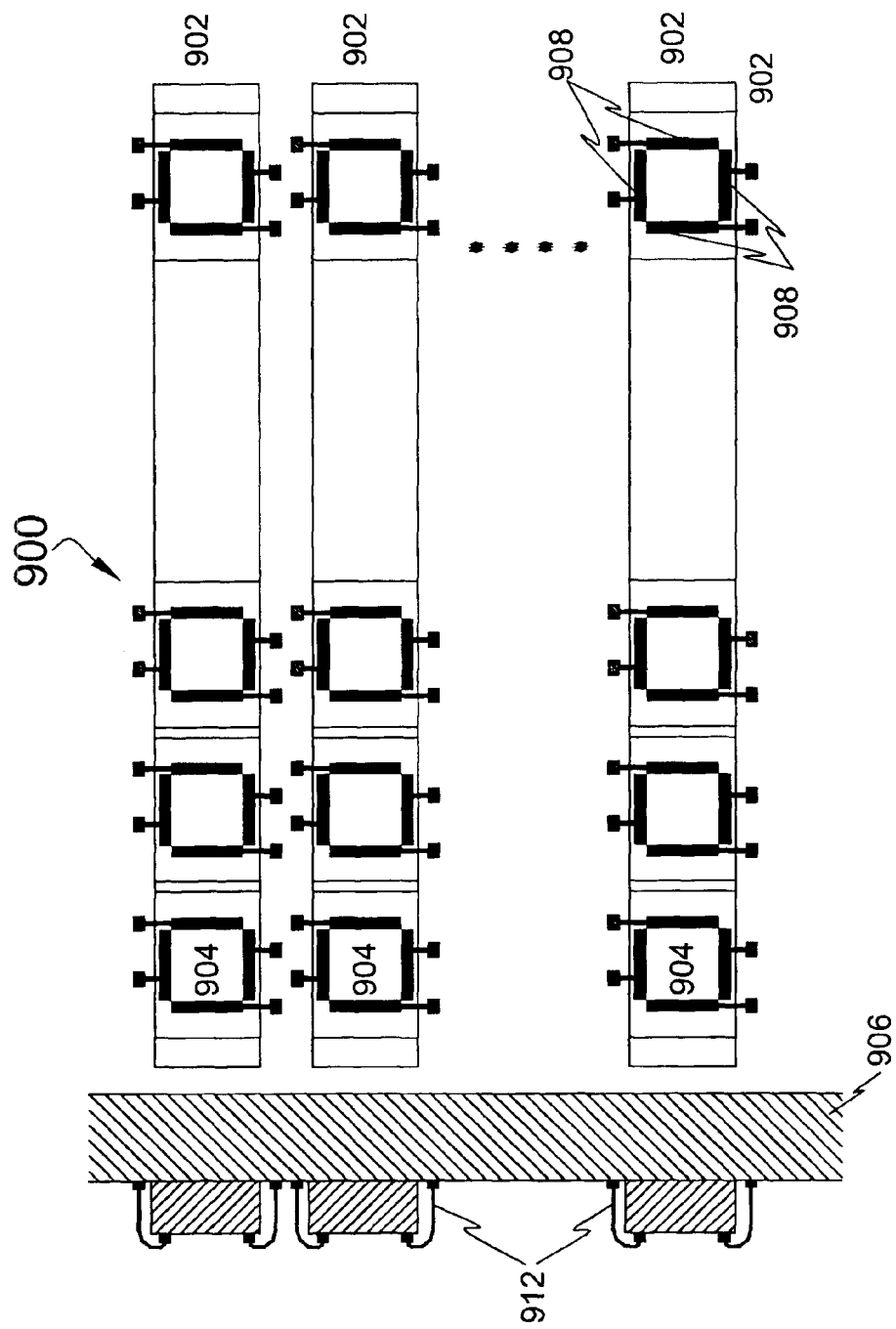

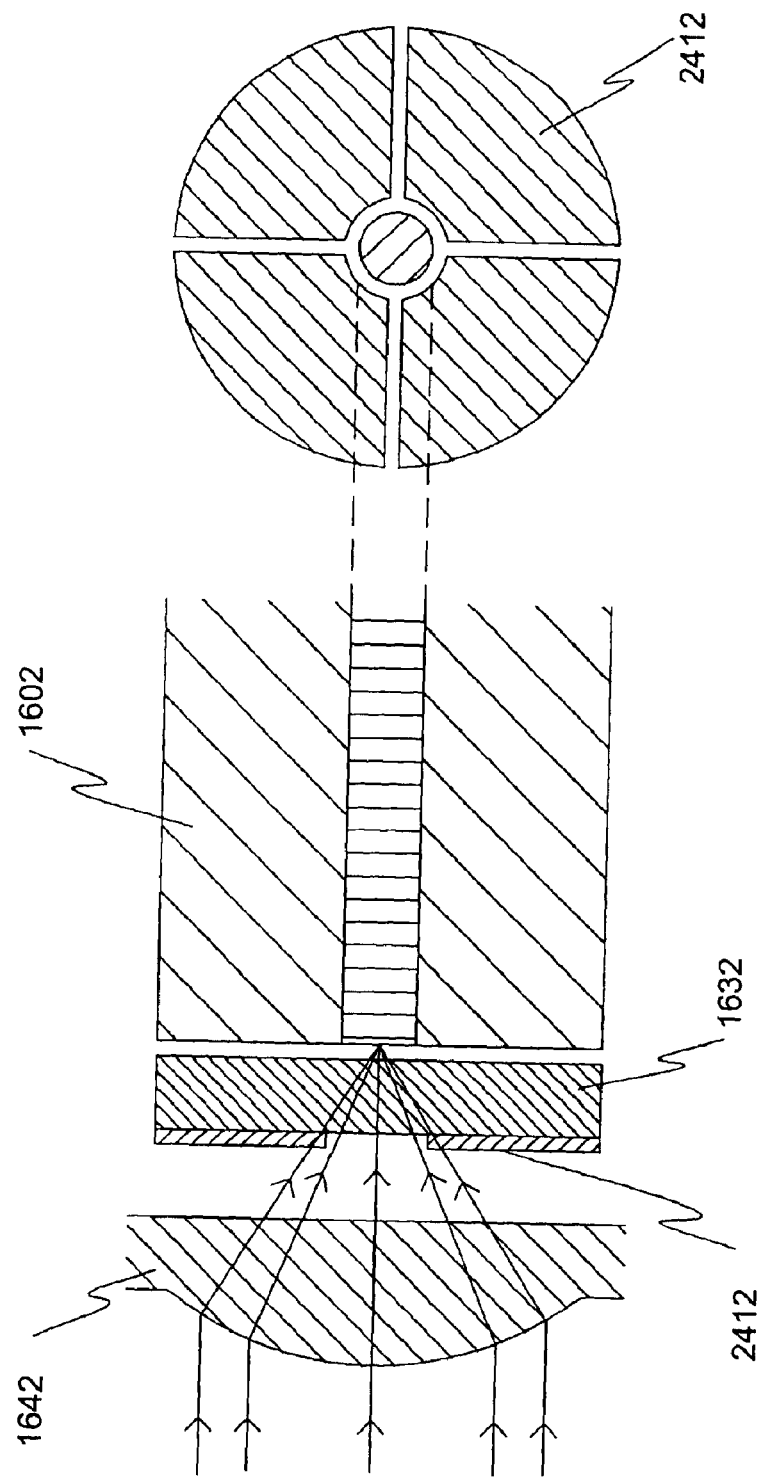

INTEGRATED FIBER, SENSOR AND LENS ARRAYS FOR OPTICAL NETWORKS

This application claims the benefit of U.S. Provisional Application No. 60/403,259 filed Aug. 13, 2002, the entire disclosure of which is incorporated as part of this application.

This application relates to optical communication devices and systems, and more particularly, to integration of fiber arrays, lens arrays, and sensor arrays to optical processing modules such as reconfigurable optical add-drop multiplexers, cross-connect optical switching arrays, wavelength-division multiplexers or demultiplexers, wavelength routers, or free space propagation fabric in optical networks.

Advances in information technologies and their applications such as Internet have increased the demand for communication bandwidth. For example, the transmission of data over a telephone trunk lines, the transmission of images or video over the Internet or other networks, the transfer of large amounts of data as might be required in transaction processing, or videoconferencing implemented over networks such as a public telephone network typically require the high speed transmission of large amounts of data. As applications such as these become more prevalent, the demand for communications bandwidth capacity increases accordingly.

Optical fiber is a transmission medium and is well suited to meet this increasing demand for communication bandwidth. Optical fiber has an inherent bandwidth that is much greater than metal-based conductors, such as twisted pair or coaxial cable; and protocols such as the SONET and Ethernet optical carrier (OC) protocols have been developed for the transmission of data over optical fibers.

Optical fiber has been widely used to form optical networks that carry data, voice and video over optical fibers using multiple wavelengths of light in parallel. Light is routed through the network from its originating location to its final destination. Since optical networks do not generally have a single continuous optical fiber path from every source to every destination, the light is switched as it travels through the optical network. Previously, this switching was accomplished using optical-electrical-optical ("OEO") systems, where the light signal was converted to an electrical signal, switched electrically, and the switched electrical signal was converted back to an optical signal.

However, because in OEO systems the signal must be converted from the optical domain to the electrical domain, switched, then converted back into the optical domain, the OEO systems for such operations in general can be relatively large, complex, and expensive. Moreover, many electrical systems have slower performance than optical systems and they are not transparent to wavelengths and communication protocol. Hence, the use of an OEO system can create a bottleneck in the optical network.

All-optical cross-connect switching systems have been investigated and developed based on a variety of different technological approaches to optical switching, such as movable mirrors, acousto-optic diffraction, electro-optic refraction, magneto-optic switching, movable bubbles, and liquid crystal addressable arrays. Each of these and other optical switching technologies has its own performance characteristics, advantages and disadvantages. One issue associated with optical switching is the variation in the optical intensities of different signals after switching. For example, in the system where an optical cross connect switch resides at nodes in a ring-mesh network, light signals received at the node may be of widely varying intensity. In many optical cross connect switches insertion loss is dependent on the optical path. It is typically desirable to equalize the intensity levels of the different signals before they are amplified or routed to another node.

Thus, there is a need for an optical cross-connect switching system to switch optical signals in the optical domain, without converting the optical signals to electrical signals. In particular, there is a need for an effective mechanism to integrate fiber arrays, lens arrays and position sensing arrays to an optical processing module such as an optical cross-connect switch.

SUMMARY

This application includes various implementations of a fiber alignment module for integrating an array of fibers to other optical components or modules and optical systems incorporating such a module. In one implementation, a device includes a fiber alignment module holding fibers in parallel to form a fiber array. The fiber alignment module includes first and second alignment plates, and a spacer plate engaged between the first and the second alignment plates. Each alignment plate includes an array of through holes to respectively hold the fibers. Each hole is configured to include a neck portion that is approximately the same dimension as the fiber to define a position of the fiber and a tapered portion whose dimension is greater than the fiber to assist insertion of the fiber. The spacer plate has an array of through holes in alignment with the arrays of through holes in the first and the second alignment plates to respectively hold the fibers.

In one application, the above fiber alignment module may be implemented in a device which has an optical processing module to process light and to direct light to or receive light from the fiber array held by the fiber alignment module. A lens array is included in this device at a position between the fiber alignment module and the optical processing module and is engaged to an opening in the optical processing module. The lens array has an array of lenses formed on a single substrate to collimate light from the fibers in the fiber array and to focus light to the fiber array.

In another application, the position sensitive detector arrays are included in addition to fiber and lens arrays.

This application also includes methods for fabricating, assembling, and operating various optical devices disclosed herein. In one implementation, a method includes the following operations. Alignment feature grooves are formed on at least one surface of the substrate, where each alignment feature grove is dimensioned to hold an alignment fiber member. An array of through holes are formed in the substrate to hold fibers, where each through hole has a cylindrical neck portion on one side of the substrate to tightly hold a corresponding fiber and a tapered funnel portion on another one side of the substrate with an opening greater than each fiber. The substrate is engaged to a surface of another object with matching alignment features by aligning each alignment feature in the substrate to a corresponding matching alignment feature in the surface with the alignment member positioned there between.

Another device of this application includes a fiber alignment module holding fibers in parallel to form a fiber array. The fiber alignment module includes first and second alignment plates, and a spacer plate engaged between the first and the second alignment plates. Each alignment plate has an array of through holes to respectively hold the fibers, and each through hole is configured to include a neck portion that is approximately the same dimension as the fiber to define a position of the fiber and a tapered funnel portion whose dimension is greater than the fiber to assist insertion of the fiber. The spacer plate is configured to have an array of through holes in alignment with the arrays of through holes in the first and the second alignment plates to respectively hold the fibers.

This application further describes a device to include first and second fiber arrays of fibers respectively held by first and second fiber alignment modules, and first and second lens arrays to collimate light for the first and the second fiber arrays, respectively. Each lens array includes lenses that are monolithically formed on a substrate. This device also has an optical processing module located between the first and the second lens arrays to provide optical communication between the first and the second fiber arrays and two position-sensitive detector arrays. The first position-sensitive detector array has detectors respectively corresponding to fibers in the second fiber array and each detector is configured to measure a position of a beam relative to a corresponding fiber. The second position-sensitive detector array has detectors respectively corresponding to fibers in said first fiber array and each detector is configured to measure a position of a beam relative to a corresponding fiber as well. A control unit is further included to control the optical processing module to reduce a position deviation measured at each detector in the first and the second position-sensitive detector arrays.

In this device, each fiber alignment module includes first and second alignment plates and a spacer plate engaged between the first and the second alignment plates. In each fiber alignment module, there is an array of through holes to respectively hold fibers. Each through holed is configured to include a cylindrical neck portion that is approximately the same dimension as each fiber to define a position of the fiber and a tapered funnel portion whose dimension is greater than the fiber to assist insertion of the fiber.

These and other features, implementations, applications, and associated fabrication techniques are described in detail in the following description, the drawings, and the claims.

BRIEF DESCRIPTION OF THE DRAWINGS

FIGS. 4(a) through 4(c) show one implementation of a mirror from the mirror array based on the Micro Electro Mechanical System (MEMS) configuration.

FIGS. 5(a) through 5(c) show an alternative implementation of a controllable MEMS mirror system with a torsional post arrangement.

FIGS. 9(a) and 9(b) illustrate one implementation of a position sensing detector array with bilateral sensors in an optical cross switch.

FIG. 24 includes FIG. 24a and FIG. 24b which shows one implementation of the quadrant position sensitive detectors in an assembly of a lens array and a fiber array.

DETAILED DESCRIPTION

Exemplary implementations of this application include optical switches that optically couple light from a first array of fibers to a second array of fibers. In general, such a switch is designed in a way that a light beam from any incoming fiber can be switched to any outgoing fiber with minimum light intensity loss and minimum cross talk. FIGS. 1 through 26 illustrate various aspects of the techniques and devices.

1. System Overview

An optical cross connect switch system can be designed to switch an optical signal carried by a light beam from any incoming fiber to any outgoing fiber. For purposes of clarity and ease of illustration, some of the figures and description portray the data as traveling one way from incoming fibers to outgoing fibers. However, it should be understood that data travel can also be bidirectional where data travels both ways through the switch, with each fiber acting as both an incoming fiber and as an outgoing fiber, although not at the same time. To accomplish this, the system may have a symmetrical functionality, where some elements of the switching system on only one side (incoming or outgoing side) are illustrated and described in this application while duplicate counterparts of such elements on the other side may not be shown or described.

Assuming there are N incoming fiber lines and M outgoing fiber lines, the optical cross connect switch is referred to as an N×M switch. For some short haul applications, N and M may be less than 32. For long haul applications, N and M are generally large, e.g., in the range from 1024 to 4096 in certain applications. For wavelength management, N and M may be between 40 and 160 at present time.

Figure 1:
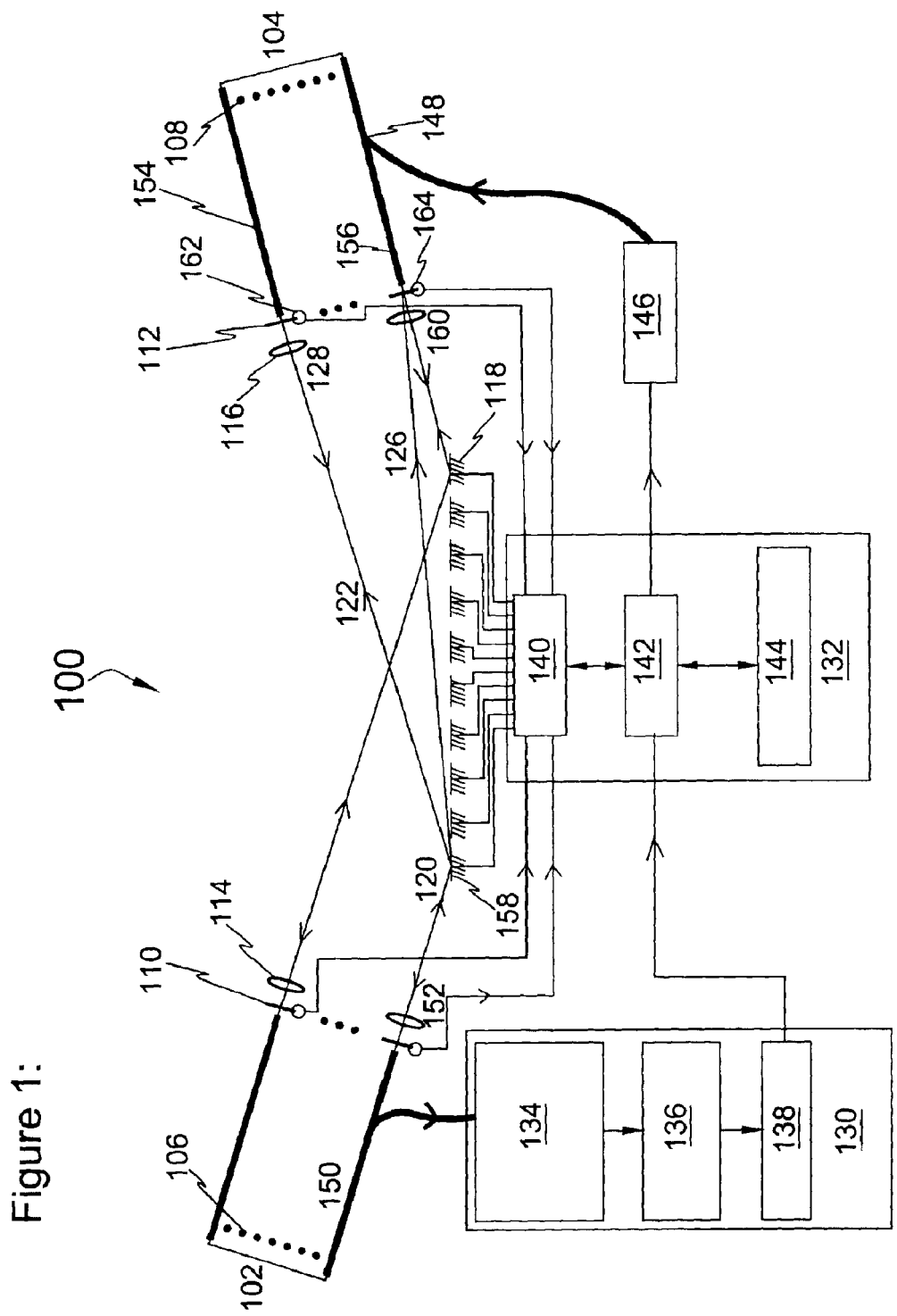
FIGS. 1, 2, and 3 show exemplary implementations of optical cross switches.

FIG. 1 is a diagram showing an overview of an N×M bidirectional optical cross connect switching array system 100 in one implementation. The system 100 may be configured to include the following building blocks or components:

1. Arrays of fibers 102 and 104 with their respective alignment structures 106 and 108 for holding and aligning fibers;

2. Lens arrays 114 and 116, which may be formed by either refractive optical elements including gadded index lens arrays or diffractive optical elements and are used to collimate the outgoing light beams and increase the coupling efficiency of incoming light beams, where the lens arrays 114 and 116 typically collimate light exiting from the fibers and focus light entering the fibers;

3. Position sensitive detector arrays 110 and 112 for sensing the position of the light beams entering into fibers;

4. A mirror array 118 to direct the light beam from any incoming fiber to any outgoing fiber;

5. Servo electronics 140 to control deflection of mirrors in the mirror array 118 so that the mirror array 118 may operate to, e.g., direct light beams to selected destinations, align light beams onto the outgoing fibers, and maintain optimum positioning of the light beams;

6. A switch configuration controller 130 comprising a single channel demultiplexer 134, a photodetector and amplifier 136 and a decoder 138 to determine the destination for the light from each fiber, and configured to dynamically control the cross connect switch 100 configuration;

7. Fiber splitters coupled to photodetectors to monitor intensities of light coupled into each fiber (illustrated in other figures and not specifically shown in FIG. 1); and 8. A system controller 132, in this case comprising a digital signal processor 142, application programming interface 144, and the mirror servo electronics 140 to control the mirror array 118.

The following description addresses the switching of a light beam from one of the fibers 150 in array 102 to fibers in array 104. However, the description is equally applicable to switching a light beam between any fiber in array 102 to any fiber in array 104, or from any fiber in array 104 to any fiber in array 102.

As illustrated in FIG. 1, a beam of light 120 is carried on a given individual incoming fiber 150 in the incoming fiber array 102. The beam of light 120 may include multiple parallel streams of optical data signals at multiple wavelengths. The beam of light 120 is also capable of containing streams of optical destination signals carrying information identifying the destination for each optical data signal within the beam.

In this example, the optical destination signal includes instructions on routing of data signals and configuration of the whole switching array. The optical destination signal is carried on one data channel in one selected incoming fiber 150. The light beam on the selected incoming fiber 150 is split by using an optical splitter, such as a fiber coupler, into two parts with one main part continuing in the fiber 150 into the switch and another part to the switch configuration controller 130. The part to the switch configuration controller 130 may be a small fraction of the input signal and is converted into the electrical signals by the controller 130. The controller 130 interprets the instructions on the routing of data. Within the switch configuration controller 130, the single channel wavelength division demultiplexer 134 selects the channel containing the instructions and directs the selected channel to the photodetector with amplifier 136 which converts the optical signals into electrical signals. These electrical signals, in turn, are decoded by the decoder 138. The decoded signal provides information for the proper configuration of the switch system 100. The system controller 132 uses this information to configure the mirrors in the mirror array 118 to perform the desired switching.

In one implementation, the single channel demultiplexer 134 may be a Fiber Bragg grating. Other demultiplexers can be used in other implementations. The switching system 100 may be part of one node in a larger network with, e.g., a mesh or mesh-ring type architecture. In this case, wavelength division demultiplexer 134 is generally needed only on one side such as in the incoming side but for redundancy reasons can be included on the "outgoing" side also. Decoded signals from the decoder 138 within the controller 130 are fed into digital signal processor 142 within the switch configuration controller 132 that provides instructions to servo electronics 140. The servo electronics 140 then position the mirrors in the mirror array 118 to correctly route the data signals. In alternate implementations, the instructions for routing data may be obtained in other manners, for example by providing configuration instructions electrically, using electrical communication between nodes of the cross connect switching system. Also, in some implementations, the system controller 132 may include an application programming interface 144 for controlling and monitoring performance of the whole cross connect switching system.

In general, the beam of light 120 exits the fiber 150 in a diverging manner. To mitigate effects of this divergence, a lens 152 in the first lens array 114 is positioned and used to collimate the beam of light 120 so that the beam propagates to the mirror array 118 without significant divergence to a first mirror 158 in the mirror array 118. The first mirror 158 has been positioned by the mirror servo electronics 140 to direct the beam of light along a first optical path 122 to a second lens 128 in the second lens array 116. The second lens 128 focuses and couples most of the light 120 into the outgoing fiber 154 in the outgoing fiber array 104. This way, the optical loss is minimized as the light passes through the switching system 100 and insertion losses can also be minimized.

Position sensitive detector 162 within the position sensitive detector array 112 are designed to detect the position of the light beam entering the outgoing fiber 154 in the outgoing fiber array 104. Implementations of position sensitive detectors include but are not limited to bilateral photodetectors, quadrant photodetectors, charge coupled device imaging arrays, complementary metal oxide semiconductor device imaging arrays, or infrared imaging arrays. The position sensitive detectors may be placed in several alternative locations in alternative implementations to act as the position sensitive detector arrays 112 and 110 and generate position error feedback signals for the system controller 132 that controls mirror positioning.

In operation, the position sensitive detector 162 provides signals that indicate the position of the light beam 120 with respect to the core of the outgoing fiber 154. Similar position sensitive detectors are implemented at other fibers in the fiber array 104. In some implementations, the position detectors detect the light beams that carry the optical data signals. In other implementations, the position detectors detect registration light beams that have a different wavelength than the light beams that carry the optical data signals, but which propagate along the identical optical path as the light beams that carry the optical data signals. The position detectors generate a feedback signal that drives the servo electronics 140 in the system controller 132 for each set of two mirrors within the mirror array 118. In response to this feedback signal, the servo electronics 140 provides the initial alignment after switching and maintains this alignment continuously and dynamically until the instructions for reconfiguration are received through demultiplexer-receiver system.

More specifically in one implementation, the light beam 120 is positioned over the core of the outgoing optical fiber 154 for the maximum light to enter the outgoing optical fiber. Deviation of the light beam 120 from the optimized position over the core of fiber 154 causes a deviation in the feedback signal that is generated by the position sensitive detector array 112 and fed into the switch configuration controller 132. The mirror servo electronics 140 within the system controller 132 receives the feedback signal and in response controls the deflection of the mirror 158 to align the light beam 120 into the outgoing fiber 154. FIG. 1 shows the position sensitive array 112 as being directly in front of the outgoing fiber array 104. However, in other implementations, the position sensitive array 112 is placed in alternate locations in the optical cross connect switching system 100.

In this implementation, the digital signal processor 142 within the system controller 132 generates a new destination signal or other signal to provide information on the status of the optical cross connect switching system 100. This signal allows proper switching at other switches or a network manager on the network. The digital signal processor 142 sends this signal to the transmitter 146, which converts the signal to an optical signal. The transmitter 146 then couples the optical destination signal to the one selected outgoing fiber in the outgoing fiber array 104 via a multiplexer 148.

When light beam 120 is to be switched into a second outgoing fiber 156, the switch configuration controller 130 receives a destination signal identifying the new destination outgoing fiber 156. The switch configuration controller 130 sends the new destination to the system controller 132, which repositions the mirror 158 in the mirror array 118 so that beam 120 follows the optical path 126 to the lens 160 in the second lens array 116. The lens 160 focuses and couples most of the light 120 into the outgoing fiber 156 in the outgoing fiber array 104, using feedback from the position sensitive array 112 as described above.

In a similar manner, the light beam 120 can be directed to any outgoing fiber in the outgoing fiber array 104. The switch configuration controller 130 determines the destination for light carried by all the incoming fibers. The system controller 132 controls the deflection of the mirrors in the mirror array 118 to direct the light to the destination outgoing fiber. The position sensitive detectors in the position sensitive array 112 provide feedback to optimally position the light beam over the core of the outgoing fiber.

In bidirectional implementations, light beams also travel from the outgoing fibers in the outgoing fiber array 104 to incoming fibers in the incoming fiber array 102. This is done in the same way as light beams traveling from incoming fibers in the incoming fiber array 102 to outgoing fibers in the outgoing fiber array 104. The switch configuration controller 130 receives the optical destination signal from the fibers 104, the system controller 132 positions the mirrors in the mirror array 118 to direct the light beams to the appropriate fibers 102, and the position sensitive array 110 provides feedback to optimally position the light beam over the core of the fibers 102.

The fiber arrays 102 and 104, alignment structures 106 and 108, position sensitive detector arrays 110 and 112, lens arrays 114 and 116, and mirror array 118 are shown as one-dimensional in the implementation of FIG. 1 for clarity. In preferred implementations, the arrays may be two-dimensional. For example, in an implementation with a two-dimensional mirror array 118, there are rows and columns, or some other twodimensional arrangement of mirrors. The other arrays and alignment structures are similarly two-dimensional in some implementations. In addition, the overall system is shown as two-dimensional in FIG. 1. In preferred implementations, the system can have a three-dimensional structure, as the additional dimension in and out of the plane of the paper can be advantageously used to position the various components.

The feedback from the position sensitive arrays 112 can also be used to intentionally and controllably misalign a light beam with respect to the core of its outgoing fiber. This controlled misalignment can be used to introduce variable optical attenuation in the switching system to control the output power levels of the signals. The attenuation can be set to different levels, using the feedback to maintain the attenuation at the desired level. If the mirror array 118 is used simply to vary this attenuation but not to switch between fibers, then the result is a variable optical attenuator (VOA). If both the switching and variable attenuation capabilities are utilized, the result is an optical switch with equalization.

Figure 2:
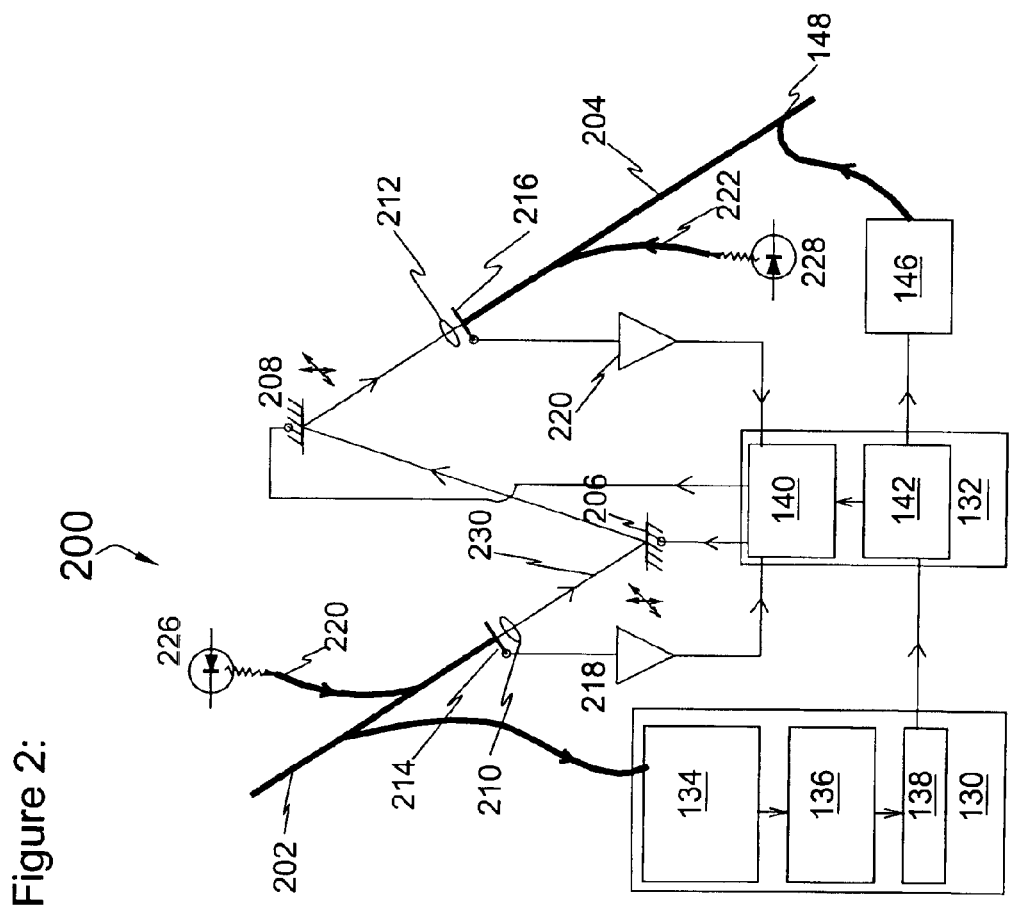

FIG. 2 shows an optical cross connect switching system 200 that uses two controllable mirrors 206 and 208 for optical switching between input and output fibers 202 and 204. This configuration forms the basis for optical switch with two array of mirrors between multiple input and output fibers as shown by an exemplary system 300 in FIG. 3. By using two mirror arrays, the optical cross connect switching system 300 of FIG. 3 directs a light beam from any incoming fiber into any outgoing fiber with optimal light coupling. By using appropriate deflections of the mirrors in the mirror arrays, the central ray of the light beam impinges any of the outgoing fibers in parallel with the fiber axis. In addition, FIG. 2 illustrates the use of registration beams, generated by sources 226 and 228 respectively, for position sensing and feedback.

For simplicity, FIG. 2 depicts only one incoming fiber 202, one outgoing fiber 204, the fibers' associated lenses 210 and 212 and position sensitive detectors 214 and 216, one mirror 206 in the first mirror array, and one mirror 208 in the second mirror array. It is understood that the principles lo illustrated are also applicable to arrays, as described with respect to FIG. 1.

FIG. 2 illustrates a light beam 230 traveling from incoming fiber 202 to outgoing fiber 204. The data light beam 230 exits from the incoming fiber 202 and is collimated by lens 210 to propagate to the outgoing lens 212 without significant divergence. Initially, data light beam 230 is directed to the mirror 206 that in turn directs the beam onto the mirror 208. The mirror 208 is chosen because it is the mirror that is aligned to allow the central axis of the light beam 230 to travel a path to the outgoing fiber 204 that is parallel with the axis of the outgoing fiber 204. Mirror 208 is angled to a position to reflect the light beam 230 toward the outgoing fiber 204 along the path that is parallel with the axis of the outgoing fiber 204. The lens 212 focuses data beam 230 onto the core of outgoing fiber 204. The fibers 202 and 204, lenses 214 and 212 and mirrors 206 and 208 are positioned so that the data beam 230 is coarsely positioned onto outgoing fiber 204 or in its vicinity. The fine positioning of the outgoing data beam 230 onto the core of the fiber 204 is accomplished with the position sensitive detector 216 and mirror servo electronics 140. The position sensitive detector 216 generates position error signals in two directions and these two signals are amplified with amplifiers 220, processed to determine two position errors and fed into the servo electronics 140 that provides closed loop control of position, as is well known to those skilled in the art of the feedback servo control. Feedback from the detector 216 is used to control both mirror 208 and mirror 206. In one implementation, the mirror deflection angles are correlated and they are moved as a couple with substantially identical deflection angles. This provides the advantages of coupling the maximum light intensity into the outgoing fiber 204 and minimizing optical insertion losses.

In addition, the fiber 220 in FIG. 2 is included to provide alternative registration light source 226 at wavelength λr that is different than data wavelengths λ1 . . . λn. The registration light source 226 at wavelength λr may be guided by the fiber 220 which is coupled to the incoming fiber 202 through a fiber coupler. Thus, within the switching, the registration light travels the same path as the wavelengths carrying the data signals. Consequently, the position sensitive detector 216 can detect the position of either the data signals or the registration light signal at wavelength λr. When data beams are used for position sensing, the position sensitive detector 216 has high sensitivity at infrared communication wavelengths. Registration light beam with wavelength λr may operate in the infrared range or in the visible range as long as its wavelength λr is different from the data wavelengths. In this case, detectors 216 are selected with high sensitivity at the registration light wavelength λr.

The optical cross connect switching system in FIG. 2 is bi-directional. At one time period, the data traffic flows from fiber 202 to the fiber 204. At another time period, traffic flows in the opposite direction, i.e. from fiber 204 to fiber 202. Consequently, additional devices are included in the system. The position sensitive detector 214 and amplifier 218 are additional devices included in the system to allow bi-directional data flow. The position sensitive detector 214 and amplifier 218 play the same role for traffic from fiber 204 into fiber 202 as components 216 and 220 do for traffic from fiber 202 into fiber 204. Similarly, registration light source 228 and fiber 222 are additional devices included in the system to allow bi-directional data flow. The function of registration light source 228 and its fiber 222 is the same as light source 226 and fiber 220 except that registration light source 228 and its fiber 222 are active when traffic travels from fiber 204 to fiber 202. Switch configuration controller 130 and system controller 132 operate in the same manner as in FIG. 1.

Figure 3:
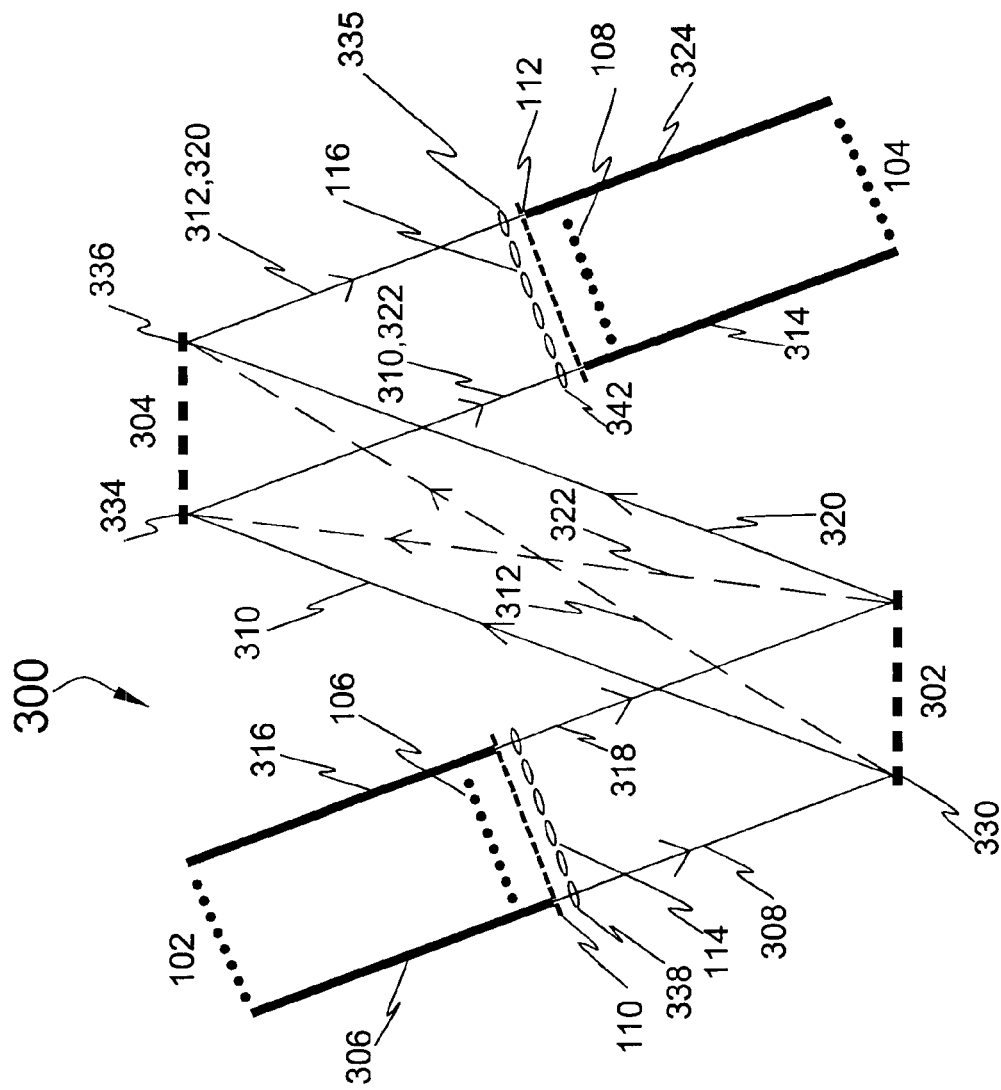

FIG. 3 shows the optical cross connect switch 300 based on two arrays of mirrors, 302 and 304, based on the design in FIG. 2. This figure also demonstrates how the two mirrors 206 and 208 in FIG. 2 and two sets of mirrors 302 and 304 in FIG. 3 direct the light from any incoming fiber to any outgoing fiber at an angle at which the central axis of light incident onto the outgoing fiber is substantially parallel with the outgoing fiber axis. Moreover, FIG. 3 clarifies how the switch 200 works with arrays of fibers and mirrors, and sends a light beam from any incoming fiber to any outgoing fiber. Thus, FIG. 3 includes the multiple incoming and outgoing fibers and multiple mirrors in the two mirror arrays.

When the light 308 from fiber 306 is supposed to be directed into fiber 314, beam 308 is collimated with a lens 338 in lens array 114, reflected from mirror 330 in mirror array 302 to follow path 310 onto mirror 334 in mirror array 304 and from mirror 334 onto lens 342 in lens array 116 that focuses the light into fiber 314. When light 308 from fiber 306 is to be switched to fiber 324, mirror 330 is deflected so that the light beam 308 follows path 312 and travels to mirror 336 in mirror array 304 and then, after appropriate deflection from mirror 336 it travels along path 312 to lens 334 in lens array 116 and fiber 324. With the two mirror arrangement, central rays of the light beam 308 are directed to follow optical paths, such as paths 310 and 312, from any incoming fiber to any outgoing fiber that are parallel with the axes of outgoing fibers 314 to 324. This allows the beam 308 to couple into the outgoing fiber with minimum insertion losses. If the light beam 308 drifts from the optimized position on cores of the outgoing fibers, position sensitive detectors in the position sensitive detector array 112 provide a position error signal to servo electronics that corrects position of mirrors in mirror arrays 302 and 304.

Various components in the above systems are now described in more detail as follows.

2. Mirror Arrays

Mirror arrays can be either one- or two-dimensional, depending on whether the fiber array is one- or two-dimensional. Typically, smaller fiber arrays are one-dimensional, and large systems are two-dimensional.

FIGS. 4(a) through 4(c) show one implementation of a mirror from the mirror array based on the Micro Electro Mechanical System (MEMS) configuration. Each mirror may tilt in two directions in order to switch the light between outgoing fibers and to make two-directional rotational corrections of the position of a light beam with respect to a core of optical fiber. A set of two hinges may be used in each mirror to define one direction of tilting. In FIG. 4(a), the first set of hinges 404 allows rotation around the first axis and the second set of hinges 406 permits rotation around a second axis that is perpendicular to the first axis. The mirrors preferably use two-directional actuators, i.e., actuators which permit the mirror to tilt in both the positive and negative direction with respect to an axis, in order to accomplish the full two-directional rotation correction. In alternate implementations, one-directional actuators are used instead of two-directional actuators. One-directional actuators provide a mirror that tilts on only a single axis in a positive or a negative direction. In these alternative implementations, four one-directional mirror arrays are used rather than the two two-directional mirror arrays shown in FIG. 3.

Several different technologies for driving and fabricating the mirror arrays and controlling the deflections of the mirrors in the arrays are employed in different implementations. Exemplary riving technologies include electrostatic, electromagnetic, piezoelectric, thermally activated mirrors, and other types of driving technologies. One implementation is based on two-directional, macroscopic electromagnetic galvanometer actuators fabricated with discrete mirrors, coils and magnets such as those used in optical recording drives. Two independent electric currents pass through two separate current loops, and two sets of magnetic fields are applied so that the current, magnetic field and resulting torque vectors are all perpendicular to each other. Electromagnetic galvanometer mirrors fabricated with multiple electrical turns around the mirror and the inner frame and two sets of magnets represent one implementation of two-dimensional rotating actuator. Use of Micro Electro Mechanical Systems (MEMS) in the mirrors can provide improved performance and low cost.

More specifically, FIGS. 4(a) through 4(c) show one implementation of a controllable MEMS mirror system 400, controlled by electrostatic driving technology. FIG. 4(a) shows a top view, FIG. 4(b) shows a side view, and FIG. 4(c) shows a bottom view. The MEMS mirror system 400 includes a mirror 402. In the implementation illustrated in FIGS. 4(a)–4(c), the mirror has a circular shape. In other implementations, the mirror 402 may have other shapes such as rectangle, square, or other suitable geometrical shapes. In FIG. 4(a), the MEMS mirror system 400 has two sets of hinges 404 and 406 that are placed perpendicularly to each other so that each hinge pair allows angular deflection around their respective axes. The outer set of hinges 406 allows one directional rotation of the inner frame 408 with respect to the outer frame 410. The inner set of hinges 404 allows one directional rotation of the mirror 402 with respect to the inner frame around axis that is perpendicular to the outer rotation axis.

The length, width, thickness and cross sectional shape of hinges determine the stiffness and consequently the voltages required to achieve desired deflections. The tortional hinge stiffness is proportional to the hinge width and the third power of hinge thickness and inversely proportional to hinge length.

The hinge thickness is optimized so that the stiffness is minimized but the structure is not too fragile so that it would not survive separation after fabrication, handling during assembly and shock and vibration in typical environment. In some implementations, the hinges are single, double, triple or quadruple serpentine hinges. This provides the advantage of allowing relatively narrow hinge width and long hinge length to minimize stiffness.

The reflecting surface of the mirror 402 is covered with materials that have very high reflectivity in the operating wavelength range of the switch. For optical communications, the operating range may be from about 900 nm to about 1600 nm. Most metal films have higher than 95% reflectivity in this range, and with two reflections, about 90% of the signal can be preserved. In one implementation, a gold film may be used because it has a reflectivity greater than 90% at optical communication wavelengths and long-term stability due to its resistance to corrosion and other degradation.

The mirror 402 and inner frame 408 may be made of electrically conducting material (e.g. doped silicon) or of nonconducting material (e.g. undoped silicon) that is coated with electrically conducting film on the bottom side (light 422 is reflected from the top side of mirror 402). This bottom conductive side is connected to a common electrode 420 that is typically kept at the electrical ground. Film material and thickness on the top and bottom of the mirror and inner frame are typically substantially the same in order to avoid distorting the mirror by differential stress. Metals such as Cr, Ta, Ti, and other suitable metals may be used below the optically reflecting film to improve adhesion of metals such as Au to the mirror surfaces. The driving electrode structure is defined below the mirror with an air gap 424 that is adjusted according to mirror dimensions, desired deflection angles, torque constants of hinges and voltages planned for full deflections (typically equal to 30% of the air gap between two plates of parallel capacitor to avoid snapping instability of the mirrors).

FIG. 4(c) shows that driving electrodes are divided into four segments 440, 442, 444 and 446, with two segments controlling deflections in each of the two directions. The segments are in pairs, the first pair being segments 440 and 442, and the second pair being 444 and 446. The 440–442 pair is used to tilt the mirror 402 about the hinge 404. Applying a voltage to one segment 440, while keeping the other segment 442 and top electrode 420 at the ground, tilts the mirror 402 so that the gap between electrode 440 and mirror 402 is decreased. Applying a voltage to the other segment 442, while keeping segment 440 and top electrode 420 at ground, tilts the mirror 402 in such a way that the gap between electrode 442 and moving mirror is decreased. Inner frame 408 is tilted in the same manner, using segments 444 and 446.

Four fixed electrodes 440, 442, 444 and 446 together with movable mirror 402 and movable inner frame 408 form four parallel plate capacitors. Hence, mirror 402 and inner frame 408 are part of the common movable electrode that is typically held at ground. Based on the position of the light with respect to the outgoing fiber, a voltage difference Vij1 is applied to electrode 440 to obtain a deflection aiji of the mirror around a first axis. A voltage difference Vij2 is applied to the electrode 444 in order to obtain a deflection aij2 of the mirror around a second axis. The indices i and j represent the row and the column of the mirror in the mirror array, respectively. In implementations with two mirror arrays, such as shown in FIGS. 2 and 3, another pair of voltages, Vkl1 and Vkl2, are applied to two electrodes of a second mirror actuator in the second mirror array. The pair of voltages Vkl1 and Vkl2 provide deflections bkl1 and bkl2 in the second mirror. In one implementation, typically aij1 is substantially equal to bkll and aij2 is substantially equal to bkl2.

In some implementations, the actuators are two-directional electrostatic rotational comb actuators. One such rotational comb actuator is described below with respect to FIGS. 15a and 15b. In electrostatic rotational comb actuators, rotational motion is generated by attractive forces between oppositely charged combs of an edge capacitor. Two sets of hinges are employed to provide rotational motion in two directions. Up to six leads connect electrical voltage sources with combs. For large arrays, leads are routed along the walls of the top wafer onto the lower wafer that contains driving electronics. Rotational comb designs have leads incorporated on fixed comb electrodes and the ground potential is applied to movable comb electrodes. The leads are brought along the walls toward the bottom wafer that contains driving electronics. The interconnections between the top and bottom wafers may be fabricated with flip chip packaging technology using solder reflow or conductive epoxy.

In implementations with large arrays, the electrodes preferably are addressed by a row (or column) of mirrors at the same time and then held at the addressing voltages on these electrodes until the same line is re-addressed again. This approach requires matrix addressing with at least one transistor and one storage capacitor for each pair of top and bottom electrodes (e.g., see the discussion with respect to FIG. 11 below). The capacitor plates 440, 442, 444 and 446 can be connected to electrical driving circuitry 426 with vias 448.

In one implementation, bulk and surface micromachining methods are used to build these structures. The material for the is mirror and hinges is a single crystal silicon with very low concentration of impurities and defects, which provides a long lifetime for the hinges. Alternative materials are polysilicon, metals or metal alloys such as berylium-copper. In some implementations, the mirror and hinges are fabricated with different thickness, which provides the advantage of avoiding excessive wavefront distortions of light reflected from the mirror.

In one implementation, the fabrication process for structures with different hinge and mirror thicknesses is based on bulk micromachining of double layer silicon-on-insulator (SOI) wafers. The double layer structure is produced by oxidation of silicon wafers, their lamination (internal silicon dioxide layer will be referred to as the first silicon dioxide layer), grinding to reduce the thickness of the silicon layer to the desired thickness of hinges, deposition of another silicon oxide layer (the second silicon dioxide layer), lamination of another silicon wafer and then repeating the process of grinding the wafers to the desired thickness equal to approximately to mirror thickness. Alternatively, epitaxial growth of single crystal silicon is substituted for grinding for one silicon or both silicon layers. The epitaxial option provides good control of thin layers with a good thickness uniformity.

According to one implementation, the fabrication steps is with double layer SOI wafer are as follows:

a. oxidation of both sides of the silicon wafer;

b. photolithography and etching of silicon dioxide of the bottom side of SOI wafer, where separation lines and alignment keys are also etched;

c. photolithography and deep, wet silicon etching of the bottom side of the SOI wafer with the first internal silicon dioxide layer acting as the etch stop;

d. photolithography on the top side of the wafer for open areas in final structure and etching of silicon dioxide;

e. deep, dry reactive ion etching of silicon with the second internal silicon dioxide as an etch stop;

f. photolithography for hinges and open areas and etching of silicon dioxide;

g. deep, dry reactive ion etching of silicon hinges and open areas in the final structure with the second internal silicon dioxide layer as etch stop;

h. etching of silicon dioxide in the exposed areas to open all gaps in silicon;

i. metallization of top and bottom with metallic adhesion layer(s) and high reflectivity material such as gold;

j. driving electronics on the bottom wafer;

k. deposition of insulating layer;

l. photolithography and etching of vias for electrical contacts between electronics and electrodes;

m. photolithography and silicon etching of gap defining grooves and lock part of alignment structures;

n. deposition of metallic layer for electrode fabrication; and o. photolithography and etching of conductive electrodes on the bottom wafer.

FIGS. 5(a) through 5(c) show an alternative implementation of a controllable MEMS mirror system 500 with a torsional post arrangement. FIG. 5(a) shows a top view, FIG. 5(b) shows a side view, and FIG. 5(c) shows a bottom view. In the implementation shown in FIGS. 5(a) through 5(c), the mirror system 500 has one hinge post 520 that allows mirror deflections in two directions. The mirror includes a reflective surface 502 formed over movable conductor plate 522. This torsional post design includes four electrodes 542, 544, 546 and 548, but in some implementations, complete two-directional tilting can be achieved using three electrodes. The movable mirror 502 comprises the second electrode of the parallel plate capacitors formed with the four electrodes 542, 544, 546 and 548. The mirror 502 may be normally held at the ground and is interconnected to the driving electronics through the post 520 and underlying via.

In operation, driving voltages are applied between electrodes 542, 544, 546 and 548 and the movable plate 522 in a manner similar to that described in FIGS. 4(a) through 4(c). When rotational deflection in which the gap on the right hand side of post 520 is supposed to be reduced, the same voltage is applied to electrodes 542 and 546 while electrodes 544 and 548 and the movable mirror 502 are kept at ground. The electrostatic force pulls the right side of the movable mirror 502 towards electrodes 542 and 546 and generates electrostatic torque that bends the post 520 thus allowing the desired mirror deflection. Other mirror deflections are generated by selecting two electrodes out of four electrodes and applying two different voltages to them, while keeping two remaining fixed electrodes at ground together with the top (movable mirror) electrode.

In alternative implementations, electromagnetic actuators are built to drive the mirror 502 with one central torsional post. Electrical coils with single or multiple turns are placed on the bottom of the mirror and magnets are located on the sides of mirror assembly. Two or more independent coils and corresponding two or more sets of magnets generate electromagnetic torques in two directions. In yet another implementation, the placement of coils and magnets are reversed with magnets on the mirror and coils on the base.

A fabrication method for these types of torsional post actuators relies on LIGA (Lithography/Electroplating/Molding). In one implementation, the following fabrication steps may be performed: photolithography, electroplating or vacuum deposition of the first material, removal of photoresist, deposition of the second material by electroplating or by vacuum deposition, planarization and repetition of the preceding steps for as many layers as needed. The final fabrication step normally involves removal of sacrificial material in order to release the structure.

3. Position Detectors

Figure 6A:
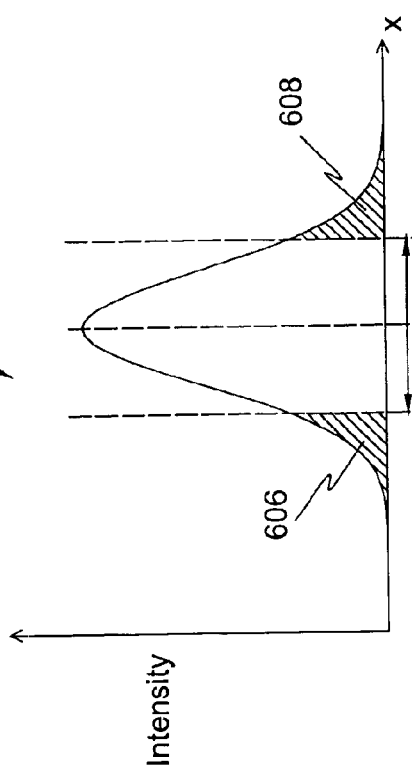
FIGS. 6(a) and 6(b) are plots to illustrate the intensity variation of laser light falling on an outgoing fiber with the distance from the center of the fiber.
Figure 6B:
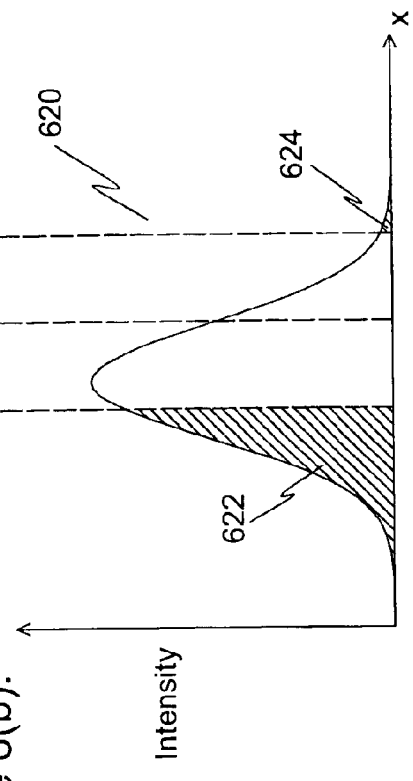

FIGS. 6(a) and 6(b) are plots of the intensity of laser light falling on the outgoing fiber, as a function of distance x from the center of the fiber. These plots illustrate the principle of position sensing. The plots in FIGS. 6(a) and 6(b) are given only for one dimension x. However, the same principle applies in a second dimension y to provide two-directional positioning feedback. As shown in the plot 600 of FIG. 6(a), the central portion of the light falls onto the core of the fiber 602 and is coupled into the fiber. The shaded regions 606 and 608 indicate light that does not fall onto the core of the fiber 602. This portion of light is lost for data transmission. However, this light can be used for position detection in the feedback control. When the two light intensities of shaded regions 606 and 608 are equal, the outgoing light is positioned optimally on the fiber.

FIG. 6(b) is a plot 620 showing a misaligned light beam. When misalignment occurs, two regions 622 and 624 on the fiber receive different amounts of light. Their difference indicates the amount of misalignment and, when sensed by the position sensor, serves as a position error feedback signal to the servo controller for the closed loop positioning of the light beam.

FIGS. 6(a) and 6(b) illustrate that, this type of position sensing uses only light that would not enter the core of the fiber 602 and would be lost to data transmission. Thus, this type of position sensing is optically efficient and does not divert light that would have been collected by the outgoing fiber.

As seen in FIGS. 1–3, in some implementations, the position sensors can be placed directly in front of the outgoing fibers. In other implementations, position sensors may be placed in positions that are not directly in front of the outgoing fibers. In these implementations, beamsplitters can be positioned in the optical path to capture and redirect a fraction of the light in the optical path. Implementations with beamsplitters result in the loss of light coupled into the fiber. However, these losses are typically small, e.g., only in a range of about 5% to about 10%. FIGS. 7 and 8 show two implementations that use beamsplitters and position sensors located away from the fibers.

Figure 7A:
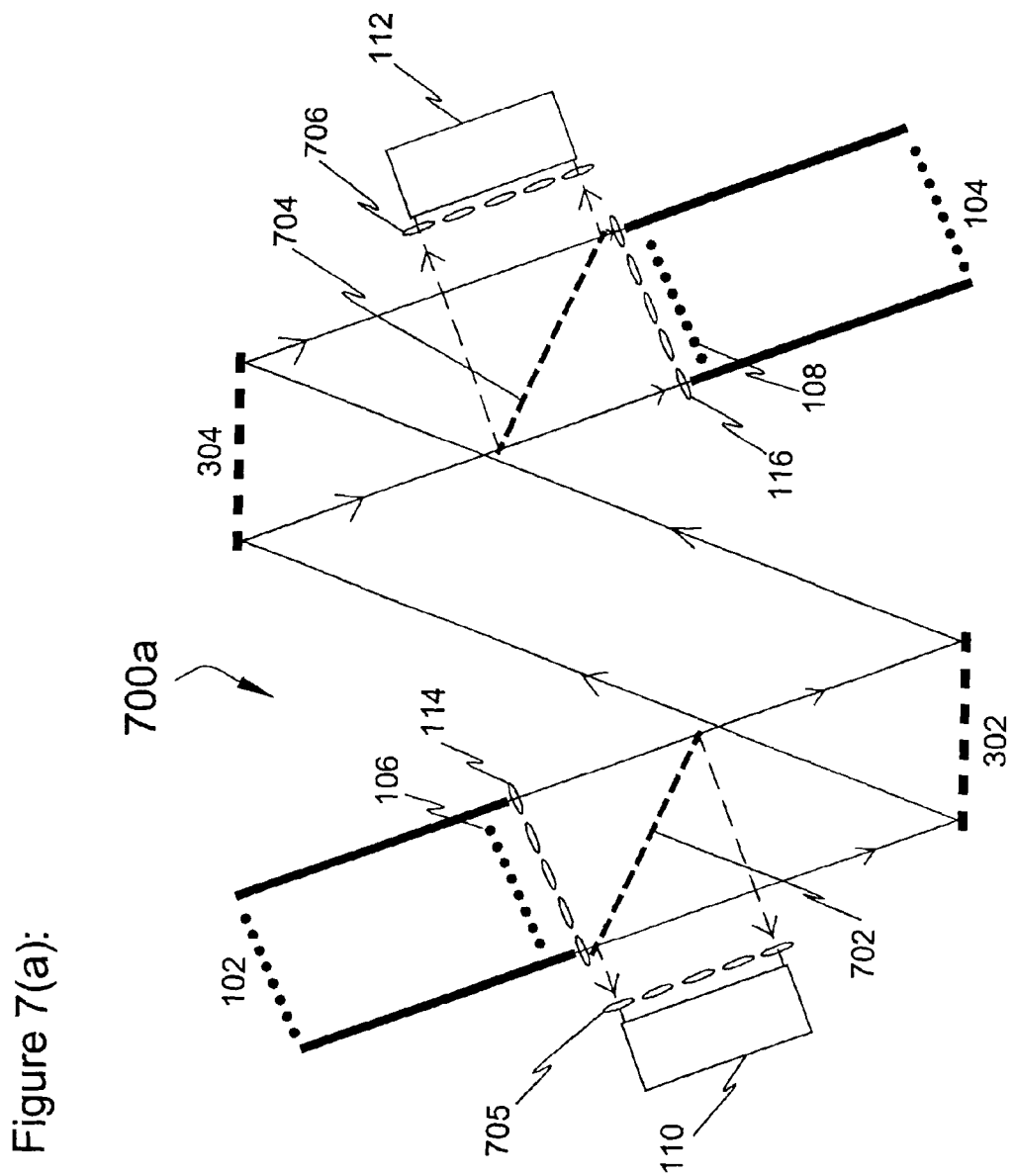
FIGS. 7(a), 7(b), and 8 show exemplary implementations that use beamsplitters and position sensors located away from the fibers in optical cross switches.
Figure 8:
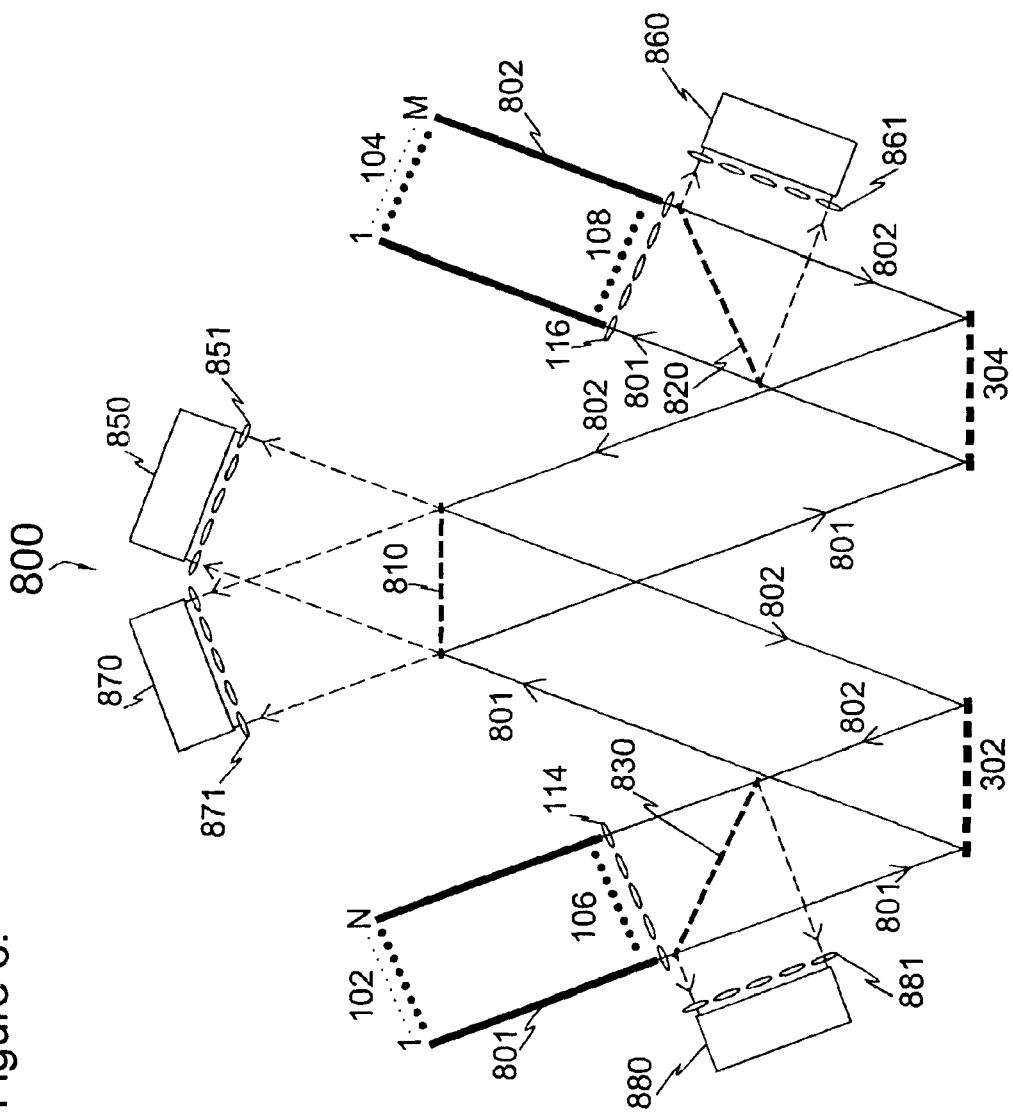

In the switch 700(a) of FIG. 7(a), instead of placing the position sensing detector arrays 110 and 112 in front of fibers, data or registration light beams are split with beamsplitters 702 and 704 before they enter into lens arrays 114 and 116. The beamsplitters 702 and 704 are selected so that they allow high transmission (typically above 95%) while reflection is limited to about 5% range. Position sensing detector arrays 110 and 112 are high spatial resolution sensitive arrays, such as bilateral or quadrant detector arrays or imaging arrays such as charged coupled devices (CCD) or complementary metal oxide semiconductor (CMOS) arrays. These imaging arrays preferably have high sensitivity at monitoring wavelengths in order to minimize insertion losses from placement of the beamsplitter into the optical paths.

For transmission of data from incoming fibers 102 into outgoing fibers 104, only beamsplitter 704 and position sensitive detector array 112 are needed. For reverse transmission, beamsplitter 702 and position sensitive detector array 110 are used. The data or registration light beams that exit from fibers 102 propagate from lens array 114 to mirror arrays 302 and 304 in the manner similar to the way described earlier. After light beams are reflected from the mirror array 304, a small fraction of light is reflected by beamsplitter 704 towards position detector array 112. The remaining light is transmitted toward output lens array 116 and outgoing fibers 104. In some implementations, the size of the position beams is adjusted to match size and pitch of individual detectors by optional lens arrays 706 and 705 placed in front of position sensitive detector arrays 112 and 110 respectively.

When a registration light signal in visible or near infrared (e.g., around 980 nm) wavelength λr is used, silicon based CCD, CMOS, quadrant detectors or bilateral detectors are appropriate choices for position sensitive detectors. When data light at standard optical communication wavelengths (e.g., 1290–1610 nm) or registration light at infrared wavelengths (e.g. 1480 nm) is used for position sensing, these detector arrays are typically based on InGaAs, GaAs, Ge or other infrared photosensitive materials.

In implementations that include a beamsplitter and position sensing detectors outside the normal optical path between incoming and outgoing fibers, as well as implementations where the position sensing detectors are in front of the fibers, positioning calibration of detectors is performed with respect to the center cores of optical fibers. The calibration is done by measuring the light intensity that reaches the outgoing fibers. When the light intensity is at its maximum, the two dimensional light beam positions on position sensitive detectors are recorded. This provides initial reference mirror positions that result in the maximum light intensity coupled into the outgoing fibers.

For implementations where the position sensors are not in front of fibers, the determination of reference positions of mirrors and position sensors may be done at the same time. The reference position of position sensors is recorded when reference position of mirrors is determined with maximized light intensity coupled into outgoing fibers. The pairs of mirrors from mirror arrays 302 and 304 are moved in small incremental rotational steps while the light intensity coupled into a selected fiber is continuously monitored. When the maximum light intensity is reached, reference mirror position is recorded in terms of two voltages required to attain the optimum position of the mirror pair. At the same time, two coordinates representing the position of beamsplitted light beam on the position sensitive detector 112 is recorded.

Figure 7B:
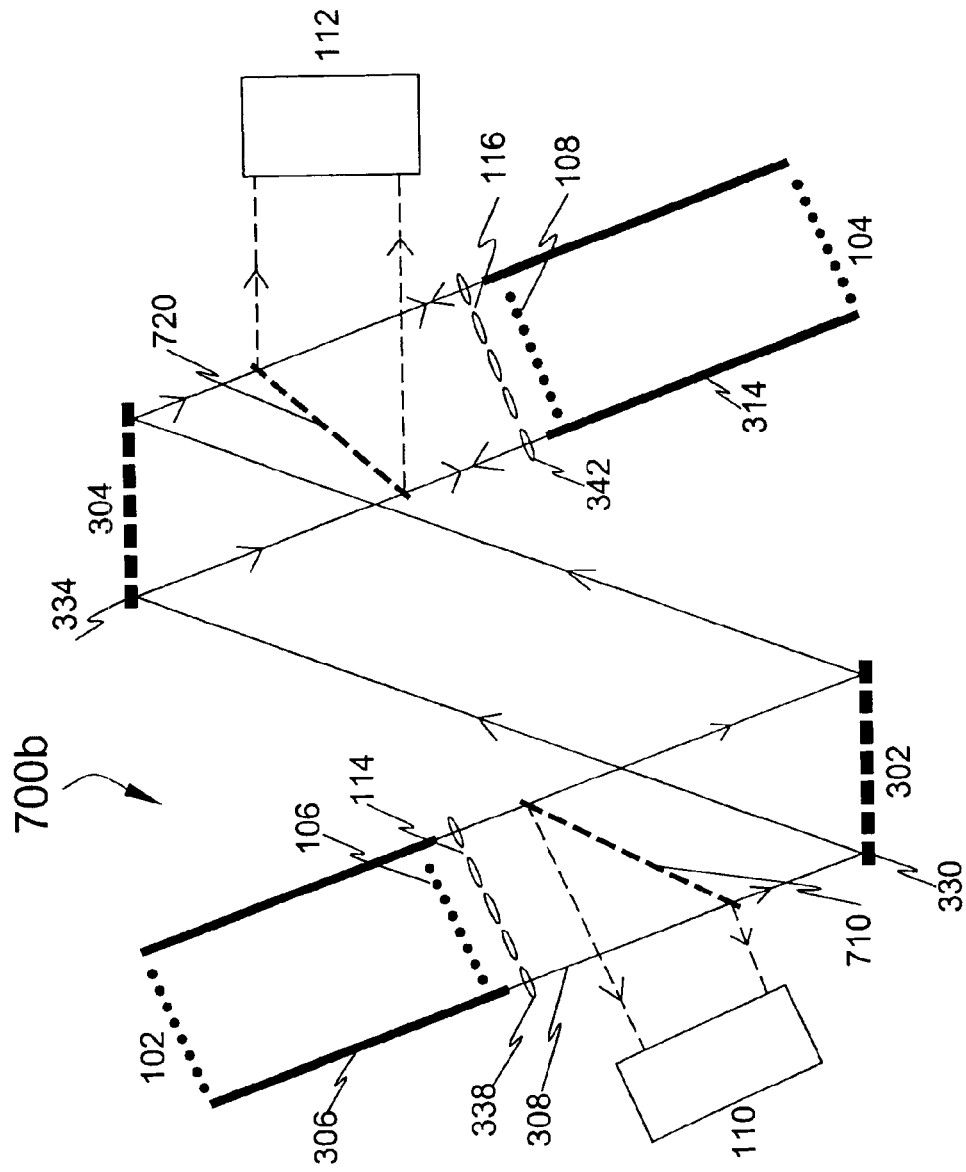

FIG. 7(b) shows another implementation of an optical cross connect switch 700b. The fiber array surface is covered by a highly reflective surface having openings over the core of fibers to reflect light failing outside each fiber core. In one implementation, the pattern of apertures that are positioned over fiber cores is created without photomasking as follows. The completed fiber array with properly terminated fiber ends (this may include plane polishing, angled polishing, laser cutting and polishing and antireflective coatings) is coated with photoresist. All fibers in the array are illuminated from the opposite end with ultraviolet light that provides exposure of photoresist. Subsequently, exposed photoresist is developed and removed from unexposed areas, leaving photoresist covering only the fiber cores. In the next step, a reflective metal film is deposited by sputtering or evaporation over the whole fiber array assembly. In the final step, the photoresist is removed which lifts off the metal covering the fiber cores. This approach provides apertures in the reflective metal coating over the fiber cores without using any photomasking operations. Alternatively, the same general approach may be used except that etching steps are used to substitute the liftoff process.

In the switch 700(b) of FIG. 7b, light beams are split with beamsplitters 710 and 720. However, in this case, the light beams travel from the incoming fibers, are reflected off the two mirror arrays 302 and 304, travel to the outgoing fibers and are back reflected from the reflective surface on the outgoing fibers. Light falling onto fiber cores is not reflected. The back reflected light from the outgoing fibers is split by the beamsplitters 710 or 720 onto position sensitive arrays 110 or 112.

For example, the beam of light 308 out of the incoming fiber 306 is collimated by lens 338, and is then reflected off mirrors 330 and 334. Next, the light beam 308 is focused by lens 342. The part of the focused light beam 308 that does not enter the core of the outgoing fiber 314 is reflected from the reflecting surface that surrounds the core of the outgoing fiber 314. This reflected light returns to beamsplitter 720, where it is split and sent to the position sensitive detector array 112. The position sensitive detector array 112 detects the position of the light beam 308 and provides feedback to the system controller 132.

When bilateral and quadrant position sensitive detectors are used in the position sensitive detector arrays 110 and 112 in FIG. 7(b), apparent beam positioning is obtained and corrections are applied to determine actual positions. When imaging arrays are used, an image of the aperture around the fiber core and back reflected light are both recorded in the image. This implementation provides the advantage that both fiber cores and light beams are imaged, so no referencing calibration is needed.

FIG. 8 shows yet another implementation of an optical cross connect switch 800 with a W-shaped configuration of two mirror arrays and a reflecting mirror. The basic functionality of this switch 800 is similar to for the Z-shaped configuration described above. This W-shaped configuration includes a fixed mirror or beamsplitter 810 apart from the fiber arrays 102 and 104, lens arrays 114 and 116, and movable switching mirror arrays 302 and 304. For bi-directional switch, optical beams follow two opposite beam paths, the path 801 from the fiber array 102 through the system to the fiber array 104, and the path 802 in the opposite direction. When data beams are used for position detection, the mirror 810 is partially transmitting (e.g., about 2% to 5% in transmission) and acts as a beamsplitter. When registration beams are used, mirror 810 can be fully reflecting at data wavelengths while it should be fully or at least partially transmitting at registration wavelengths. For unidirectional traffic, position sensitive detectors 850 and 860 are included in the system.

Compared with the previous architecture, detector 850 is added in order to simplify servo design and implementation. In order to direct light incident to the detector 860, the beamsplitter 820 is placed in the path of beams 801. When the detector 860 operates at signal wavelengths, small fraction of signal light(e.g., about 2% to 5%)is split from the main beam in the path 801. When the registration beam is used, the beamsplitter 820 can transmit the data beam without any loss of light intensity and reflect registration beam completely.

For bi-directional traffic, two more position sensitive detectors 870 and 880 are included in the system. They are functional for beams along the path 802 going from the fiber array 104 to the fiber array 102. The beamsplitter 830 is used to operate with the similar functionality in the backward direction along the path 802 as the beamsplitter 820 in the forward direction along the path 801. The lens arrays 851, 861, 871 and 881 are optionally employed in front of position sensitive detectors 850, 860, 870 and 880, respectively.

Hence, two position sensitive detector arrays may be implemented for unidirectional transmission and four position sensitive detector arrays may be implemented for bidirectional transmission.

FIGS. 9(a) and 9(b) illustrate one implementation of a position sensing detector array 900 with bilateral sensors. FIG. 9(a) represents the top view while FIG. 9(b) is the side view of the array. The implementation illustrated in FIGS. 9(a) and 9(b) can be applied in cases where the position sensing photodetector arrays are not directly in front of the fibers, such as the implementations shown in FIGS. 7A and 8. In these implementations, there is space behind the position sensing arrays available for electrical leads and integrated circuits that amplify the signals. The position sensing photodetector array 900 shown in FIGS. 9(a) and 9(b) is based on rows 902 of position detectors 904 that are attached to a chip 906 that includes integrated circuits that provide amplification of photocurrent and signal multiplexing. Each position sensor 904 has four electrodes 908. Electrical leads 912 connect the electrodes 908 to integrated circuit amplifiers on chip 906. The light beam that impinges onto the photosensitive surface leads to generation of photocurrent that flows toward all four electrodes 908. The relative magnitudes of the four currents through the electrodes 908 correspond to where the beam is located on the photosensitive surface, and provides the x and y position of the light beam. The photodetector's sensitive area is smaller than the pitch between mirrors or fibers in order to accommodate all electrical leads.

Figure 10A:
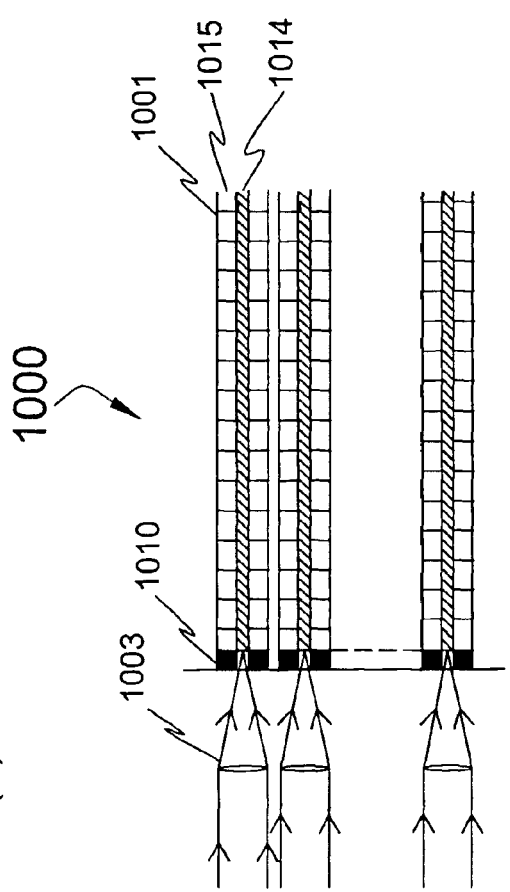
FIGS. 10(a), 10(b) and 10(c) illustrate another implementation of a position sensitive detector array suitable for use with the systems shown in FIGS. 1–3, where the position sensitive array is placed directly in front of or in contact with the fiber array.
Figure 10C:
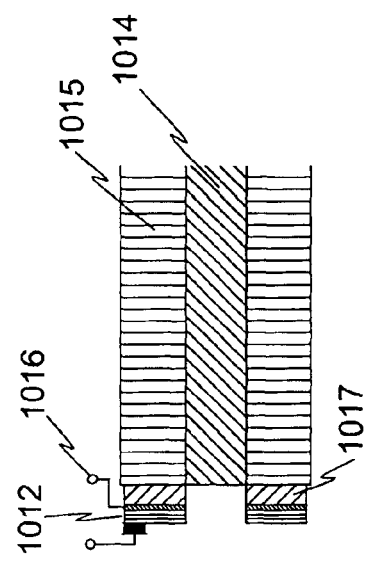
Figure 10B:
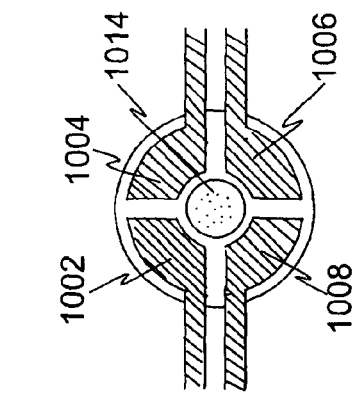

FIGS. 10(a), 10(b) and 10(c) illustrate another implementation of a position sensitive detector array 1000 suitable for use with the systems shown in FIGS. 1–3, where the position sensitive array is placed directly in front of or even in contact with the fiber array. Fiber array 1001 has cladding regions 1015 and core regions 1014. The position sensitive detectors 1010 are placed on the face of fiber array. The light is coupled into the fibers with lens array 1003.

Detailed front and side views of the single quadrant photodetector 1010 that is used in some implementations where the position sensitive detector array is in front of the fiber array are shown in FIGS. 10(b) and 10(c), respectively. The detector 1010 is divided into four quadrants 1002, 1004, 1006 and 1008. Each quadrant contains a separate detector such as a photosensitive p-n junction or photosensitive pin diode 1012. Each of these detectors 1002, 1004, 1006 and 1008 covers about a 90 degree region. The detectors do not cover the center of the fiber over an area that corresponds to the core of the fiber 1014. This area contains material that is transparent at the operational wavelength or an opening without any material. Consequently, this implementation is suitable for use with the implementation shown in FIGS. 1–3. The cross section of an implementation of a pin diode 1012 is shown in FIG. 10(c). The electrode 1016 is a common electrode and the four detector regions 1002–1008 provide four separate signals into four single ended or two differential amplifiers.

In some implementations, quadrant photodetectors in FIG. 10 are substituted by bilateral detectors similar to those described above in FIG. 9. When bilateral sensor arrays are placed in front of fibers, then one sensor with an opening over the core of the fiber is used. The sensor has four electrodes positioned on the outside edges of a photosensitive multilayer structure as in FIG. 9 above. Signals collected from these four electrodes reflect the two directional position of the light beam.

Figures 11A, 11B:
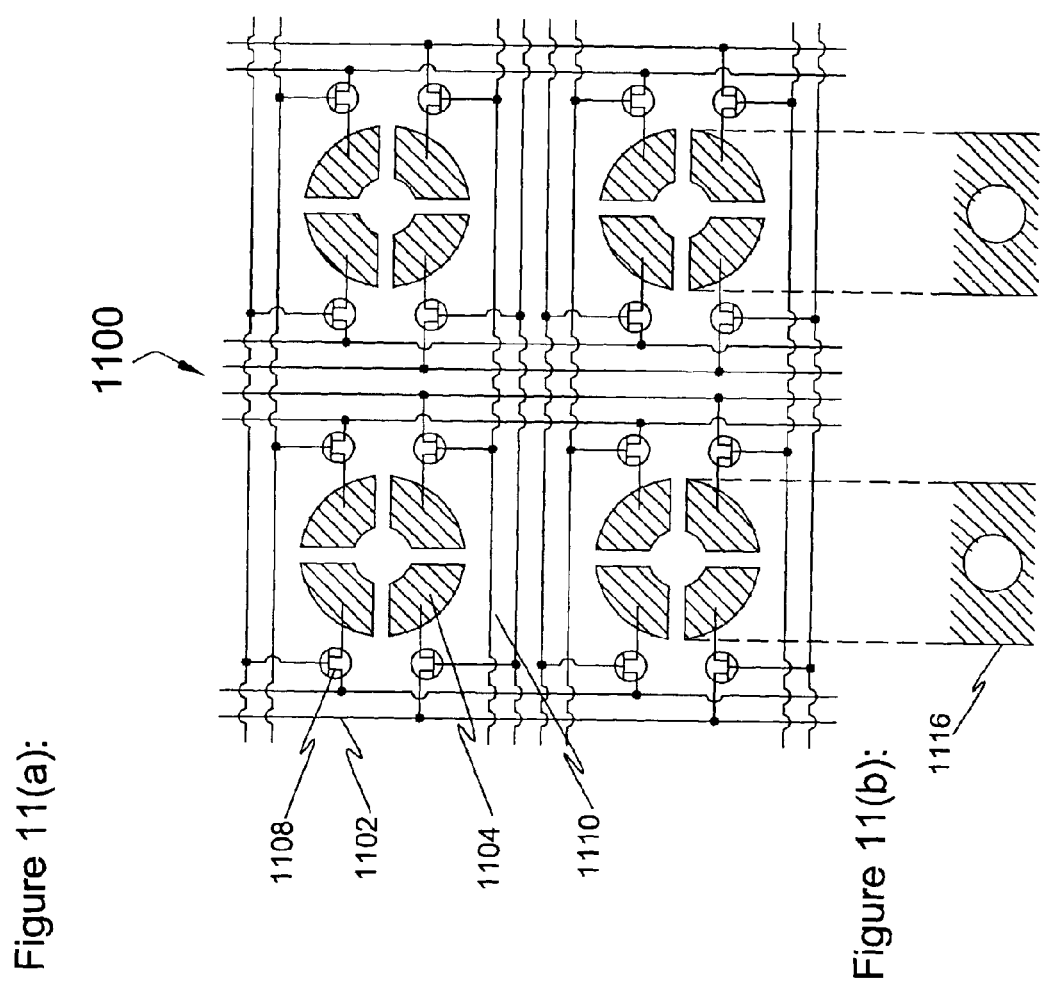
FIGS. 11(a), 11(b), 12(a), 12(b), 13(a), and 13(b) hows examples of position-sensitive detectors.

FIGS. 11(a) and 11(b) illustrate electrical lead interconnects 1100 for large position sensitive detector arrays. The interconnects 1100 shown in FIGS. 11(a) and 11(b) allow large numbers of leads to be accommodated, even when there is little space available between the sensors. The interconnects 1100 also allow fast readout of the sensors in the array. This is done by performing a matrix readout row by row (or column by column). This allows readout of one complete row at a time. The implementation shown in FIG. 11 is illustrated with an array of quadrant detectors 1104. Front electrode column leads 1102 and row leads 1110 are connected to transistors 1108. The signals applied to the row leads 1110 select one row at the time that is being read out. The signals that appear on columns correspond to positions of light beams in that specific row. During the next readout period, the next row is addressed and read out. All detectors have the same common ground electrode 1116, shown in FIG. 11(b). The configuration of this ground electrode is the same as shown in cross section in FIG. 10(c). For implementations where the common electrode 1116 is metal, the common electrode 1116 has openings for light passing into fibers. In some implementations, where a transparent electrode such as indium-tin oxide film is used, the common electrode 1116 is continuous. Signals from these photodetectors 1104 are fed into amplifiers to generate two sets of feedback signals that are fed into the servo controller. In response to the feedback signals, the switch controller 132 controls the positioning and alignment of all mirrors in the mirror array to align the light beam onto the core of fibers in two directions and maintains the alignment until instruction is received to change the configuration.

Figures 12A, 12B:
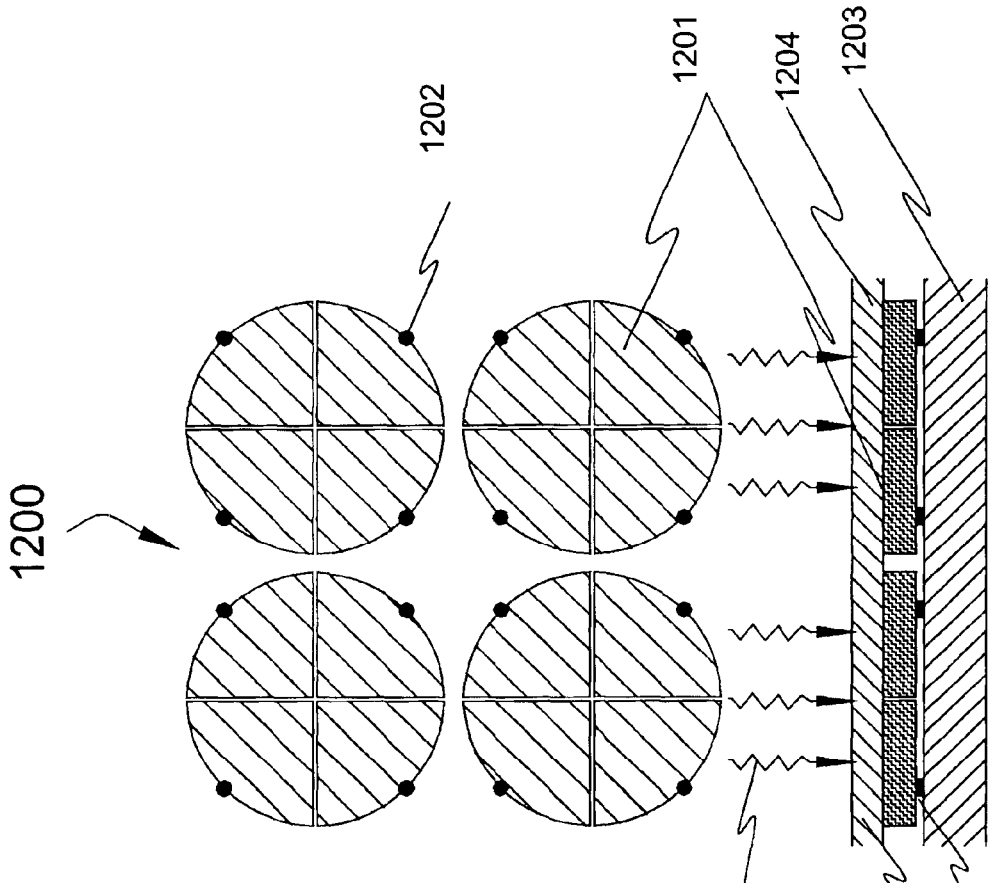

FIGS. 12(*a*) and 12(*b*) illustrate another configuration of position sensitive detector array 1200. In the previous described implementations, the illuminated surface and non-ground electrodes are on the same surface (front side illumination). In the implementation of FIG. 12, illuminated surface 1211 and non-ground electrodes 1202 are on the opposite sides (back side illumination). Light beams 1210 impinge on the substrate 1204 of position sensitive detector array. The substrate 1204 is relatively thin and does not significantly absorb the light. Most of light reaches the p-n junctions of quadrant photodetectors 1201 where photo-generated carriers are formed. The electrodes 1202 provide electrical path for carriers to amplifiers that reside in layer 1203. This quadrant photodetector 1201 generates again two dimensional position sensitive signals. In some implementations, the photodetector array 1200 is placed directly over a substrate 1203 containing amplifiers and processing electronics. This configuration of detectors is well suited for architecture described above, e.g., FIGS. 7(*a*) and 7(*b*).

Figures 13A, 13B:
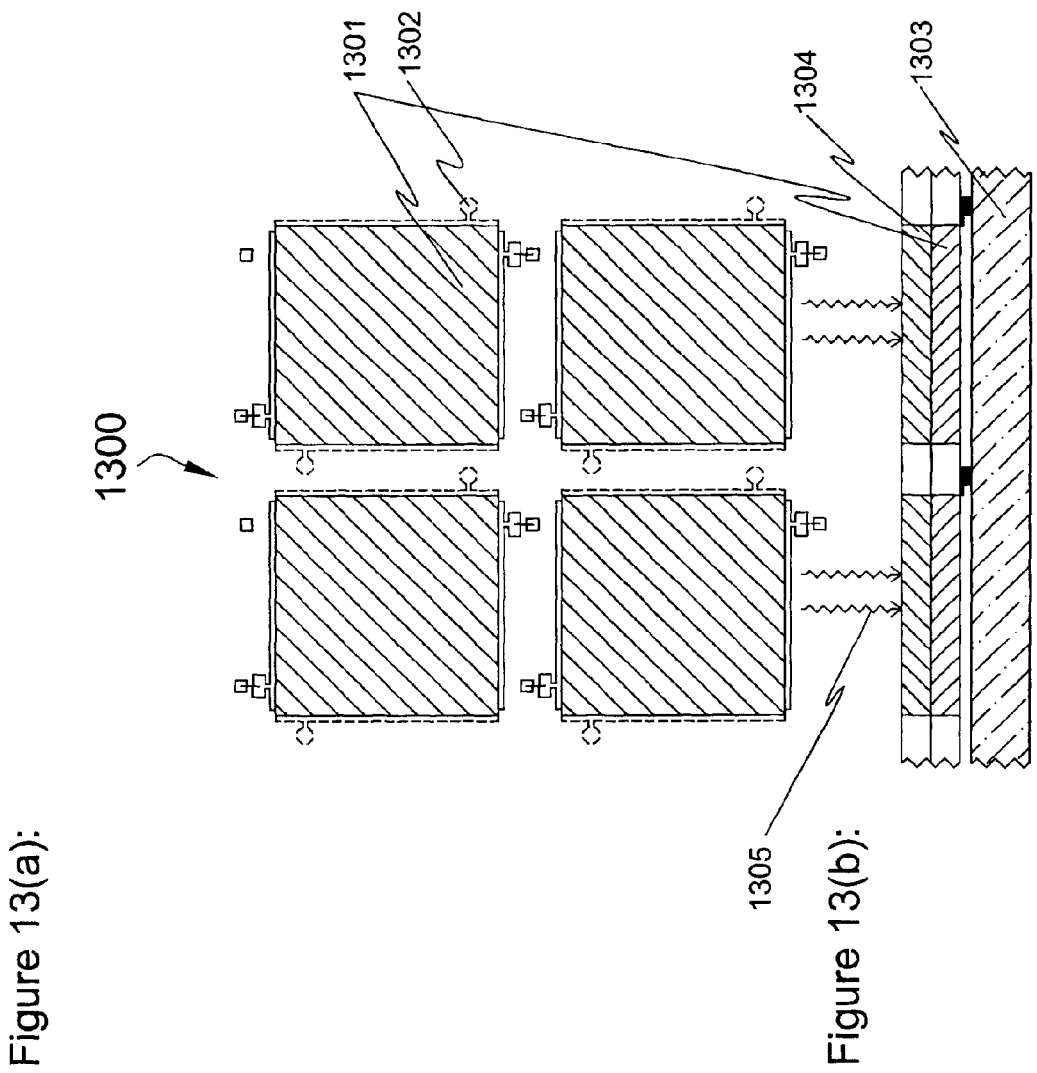

FIGS. 13(*a*) and 13(*b*) illustrate another backside illumination architecture of position sensitive detectors with bi-lateral photodetector array 1300. The bi-lateral photodetectors 1301 generate two dimensional position sensitive signals. Each photodetector 1301 has four electrodes 1302. Light beams 1305 impinge on the backside of array 1300. The electrodes 1302 connect the photodetectors 1301 to the substrate 1303 with amplifier electronics. This implementation is also well suited to the systems described in FIGS. 7A and 7B.

In some implementations, imaging CCD or CMOS arrays are used for beam positioning instead of quadrant or bi-lateral arrays in the locations for the position sensor arrays shown in FIGS. 7 and 8. Readout of the CCD or CMOS array provides data to servo control.

4. Fiber and Lens Arrays

The fiber alignment structures 106 and 108 in FIGS. 1 and 3 and in FIGS. 7 and 8 can be one- or two-dimensional depending on the size of the optical cross connect switch. Both one- and two-dimensional fiber arrays have to have precise fiber positioning and beam directionality. One implementation of onedimensional fiber arrays uses a structure of V grooves in a single-crystal silicon substrate. Two dimensional fiber alignment structures 106 and 108 for incoming and outgoing fibers are formed from a micromachined array of holes in silicon.

Figure 14:
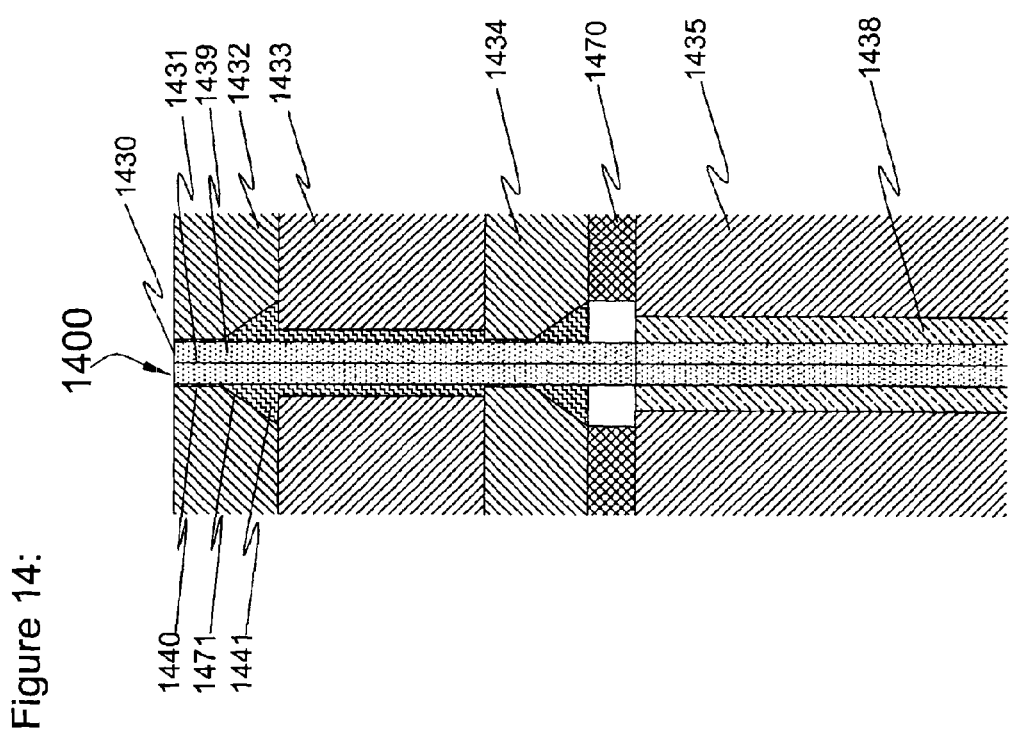
FIG. 14 illustrates an implementation of a fiber alignment module with fiber alignment plates.

FIG. 14 illustrates an implementation of the fiber alignment structure 1400 for holding an array of fibers in an optical switch system or other optical systems using an array of fibers. A section of the fiber alignment structure 1400 with one fiber 1430 is illustrated to show the basic structural components. The complete fiber alignment structure 1400 positions many fibers in an array. The section of fiber 1430 within the fiber alignment structure 1400 has a section with exposed fiber cladding 1439 and a section where the buffer 1438 is present. Multiple constricted channels or necks in the alignment layers 1432 and 1434 define the fiber position and the direction of light exiting from the fiber 1430. Fiber cladding 1439 is aligned and held with precision of, e.g., less than one micron by a series of alignment layers 1432 and 1434. These layers have guiding and aligning regions. The neck regions 1440 define the positions of the fibers, and the funnel regions 1441 with an opening dimension greater than the diameter of the fiber provide a guide for massive, parallel insertion of many fibers 1430 into the structure. In order to achieve desired beam directionality, alignment layers 1432 and 1434 are separated by a spacer 1433.

An implementation with a neck-funnel-neck-funnel (going from the surface of the fiber array 1430 towards the fiber buffer 1438) arrangement and an even or odd number of alignment layers is shown in FIG. 14. In alternate implementations with a neck-funnel-funnelneck arrangement, both an odd number of alignment layers are used. Alignment layers 1432 and 1434 and fiber 1430 are secured together with glass or glue bonds 1471 so that a hermetic seal is formed between the fiber 1430 and alignment layers 1432 and 1434. Glass bonding provides the advantages of having a thermal coefficient match between the fiber glass and bonding glass and an environmentally stable glass seal. Since glass bonding is usually performed at relatively high temperatures, special insulation spacers 1470 may be included in the alignment structures to thermally isolate buffer 1438 from alignment layers 1432 and 1434 during glass bonding.

The multiple constricted channels or necks in the alignment layers 1432 and 1434 define the fiber positions and also the direction of light exiting from the fiber 1430. The alignment layers 1432 and 1434 are usually fabricated from single crystal silicon. The funnel regions 1441 are defined with wet etching while neck regions 1440 are fabricated with deep reactive ion etching of silicon.

The buffer 1438 is configured to provide crude positioning and strain relief for fiber 1430. In some implementations, a buffer alignment block 1435 with cylindrical holes serves as a positioner and holder of buffer coatings. Alternatively, an approach similar to that used with fiber alignment layers is followed with buffer alignment layers. Openings in the buffer alignment block 1435 are larger than the funnels and bottlenecks in the fiber alignment layers 1432 and 1434 to accommodate the larger buffer diameter. Buffer 1438 and buffer alignment block 1435 are glued together to mechanically stabilize the structure and further seal it for hermetic isolation from outside environment.

The overall structure contains alignment features on each top and bottom surface of each alignment chip. In some implementations, these alignment layers are formed by two-sided photolithography so that alignment down to one micron is possible. V grooves formed in single crystal silicon, as outlined above, present an example of an alignment structure. Fibers having precise diameter and circular cross-sections are inserted into V grooves and they self align bottom surface of one chip and the top surface of another chip. Multiple stack of chips can be aligned this way and achieve chip-to-chip alignment with precision down to about one micron. The structure can include vias that go through the buffer layer and at least one alignment layer. Mechanical pins, of a controlled diameter and concentricity, can be inserted into these vias to align the alignment layer and buffer block.

Lens arrays in this application, including Lens arrays 114, 116 in FIGS. 1 and 3 or lens arrays 210 and 212 in FIG. 2, are one or two dimensional matrices of lenses. Examples of the fabrication processes of microlens arrays are placing spherical ball lenses in one or two dimensional array of precisely micromachined cylindrical or tapered holes and lens matrices fabricated with gray scale lithography, with embossing or ink jet formation of glass or polymer. Both refractive optical elements such as microlens arrays and graded index lens arrays, and diffractive optical elements may be used to form the lens arrays. The material for the lens arrays may be a glass material, a semiconductor material such as silicon, or other suitable materials.

It is contemplated that a fiber array alignment module with necks and funnels can be fabricated with molding techniques. For example, a molding material such as ceramic materials (e.g., alumina) may be used to form the substrate plate. The alignment plate is molded with pins that are placed in the molding material at desired positions. Each pin has one end widened to have the desired neck-funnel profile. After mild sintering at a desired sinter temperature, pins are pulled out and the structure is fully sintered. Shrinkage is taken into account by using pins of somewhat larger diameter than the final desired diameter. The voids left behind in the shaped molding material after removal of pins with cylindrical profile and conical ends are through neck-funnel features that allow insertion and positioning of fibers. Pins can be made of a high melting temperature material such as tungsten, stainless steel, etc. The melting temperature of the pin material should be higher than the molding material for the substrate plate.

5. Mirror Actuator

Figure 15A:
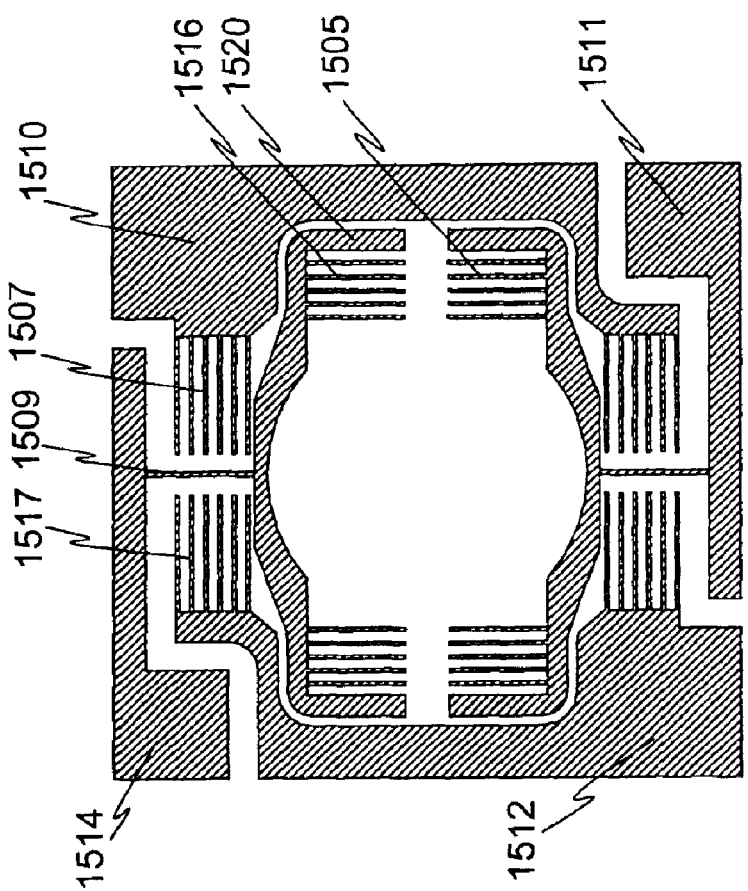
FIGS. 15(a) and 15(b) show an exemplary electrostatically-driven MEMS mirror system with a twodirectional rotational comb actuator.
Figure 15B:
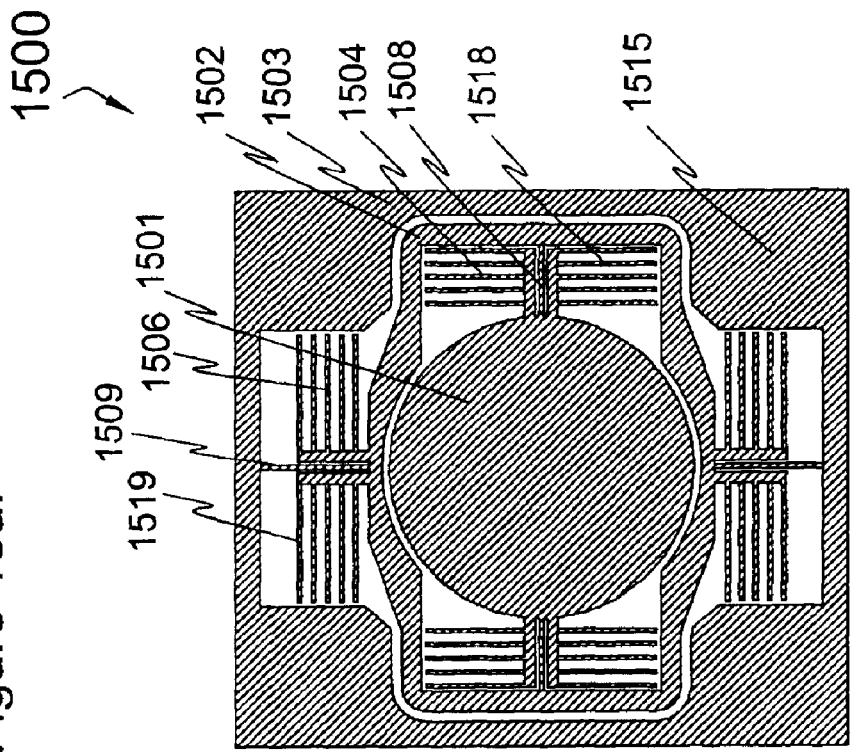

FIGS. 15(a) and 15(b) show an exemplary electrostatically-driven MEMS mirror system with a twodirectional rotational comb actuator. The rotational motion is generated by attractive forces between oppositely charged teeth. The MEMS mirror system has a mirror 1501, an inner frame 1502, an outer frame 1503, sets of inner movable teeth 1504 and 1518, sets of inner fixed teeth 1505 and 1516, sets of outer movable teeth 1506 and 1519, sets of outer fixed teeth 1507 and 1517, two inner hinges 1508 and two outer hinges 1509. The set of inner fixed teeth 1505 are fixed with respect to the movable inner teeth 1504, but not with respect to outer frame 1503. The top actuator portion, shown in FIG. 15(a), is electrically isolated from the bottom actuator part, shown in FIG. 15(b). The mirror 1501, teeth 1504, 1518, 1506 and 1519, inner frame 1502, outer frame 1503 and hinges 1509 and 1508 are kept at the same potential, typically ground, labeled as 1515. Voltages are applied to bottom teeth 1516, 1505, 1509 and 1517 in order to generate rotational deflections. The voltages are applied through electrically conducting blocks 1510, 1511, 1512 and 1514 that are electrically isolated from each other but are connected electrically to teeth 1507, 1505, 1517, and 1516 respectively.

The following description of the operation of the actuator only deals with one rotational deflection of the mirror 1501. However, the other deflections of mirror 1501 and inner frame 1502 are generated in the similar manner. In order to rotate the mirror 1501 around the axis defined by inner hinges 1508 so that the top part of the mirror moves down and consequently the bottom part of the mirror moves up, the voltage is applied to electrode 1514 while all other electrodes 1510, 1511 and 1512 are kept at ground. The electrostatic attraction between inner movable teeth 1504 and inner fixed teeth 1516 generates rotation around an axis going through two inner hinges 1508. In order to generate rotational motion in two directions, two different voltages are applied. One voltage is applied as described above between top ground plate 1515 and teeth 1516 and another voltage is applied between the ground plane 1515 and outer fixed teeth 1507.

The electrostatic rotational comb actuator has the advantage of generating significantly greater torque than some other actuators. Consequently, higher rotational angles can be obtained with rotational comb drive than with other types of drives, such as parallel plate drive, at the same driving voltages. Alternatively, when the same driving voltages are used, a MEMS mirror system with rotational comb drive can have much higher hinge stiffness than parallel plate drive and still obtain the same rotational angles.

6. Mirror Control

The servo system for the above optical cross connect switches may be designed to operate in the following manner. The electronics continuously scans through the whole system sequentially, typically one row of photodetectors and one row of mirrors at a time, with an overall cycle period Tc. When there are N fibers present, time to detect signals from a single row of photodetectors will be about $tu=Tc/(N)^{1/2}$. Once the signals from the photodetectors are acquired, the driving voltages to all mirrors in a given column are adjusted and kept at this level until the photodetectors are re-addressed Tc time later. In the following update period tu, the next row of photodetectors is sensed and voltages for the second set of mirror electrodes are re-adjusted. The updating time tu depends on the time necessary to acquire signals with an acceptable signal-to-noise ratio. The overall cycle period Tc depends on the number of mirrors in the array, but is typically kept below a specified period, e.g., 1 msec, even for large arrays. The drifts and environmental changes have a time scale that is much longer than the update time. Shock and vibration disturbances are also minimized through closed loop servo control.

7. Integration of Fiber, Sensor, and Lens Arrays

Many optical devices and systems in optical networking applications are configured with free propagation of light carrying various information such as data, video and voice. Examples of such devices and systems include, among others, optical cross-connect switches, wavelength division multiplexers, optical add-drop multiplexers, and wavelength routers. Typically, light may be brought or received from an array of fibers, collimated through a lens array, subsequently propagated through the switching or multiplexing/de-multiplexing device, and then focused by a lens array to couple back into another array of fibers. In some cases, an additional array of optical sensors may be needed between the fibers and lenses. In bi-directional systems, these sensor arrays have to be placed on both the incoming and outgoing sides of the systems.

Assembly and alignment of fibers, sensors and lenses can be particularly challenging for large arrays that are typically used in long-distance and metro applications where the number of fiber channels exceeds a certain number of channels, e.g., 32 channels. In many of these cases, one dimensional (1D) arrays can be inadequate for accommodating the large capacity and thus a two dimensional (2D) array may be desirable. In 1D arrays, V grooves fabricated on silicon wafers with lithography and wet etching of bulk silicon are used. Precise spacing and directionality of light can be achieved when the lens array and fiber array have identical pitch and are aligned translationally and rotationally. Such techniques may not be applicable to fabrication of 2D arrays built by stacking 1D arrays because thickness tolerances from one array to the next array add in the stacking direction.

Novel approaches to alignment and assembly of 1D and 2D arrays of fibers, lenses, and sensors are disclosed in the following sections. Such approaches can be used to achieve alignment precision limited only by photolithographic tolerances (e.g., about few hundreds of nanometers), variations of diameter and concentricity of fibers (e.g., typically a fraction of one micron for some specialized fibers) and passive alignment features between fiber, lens and sensor arrays (e.g., below one micron).

Figure 16:
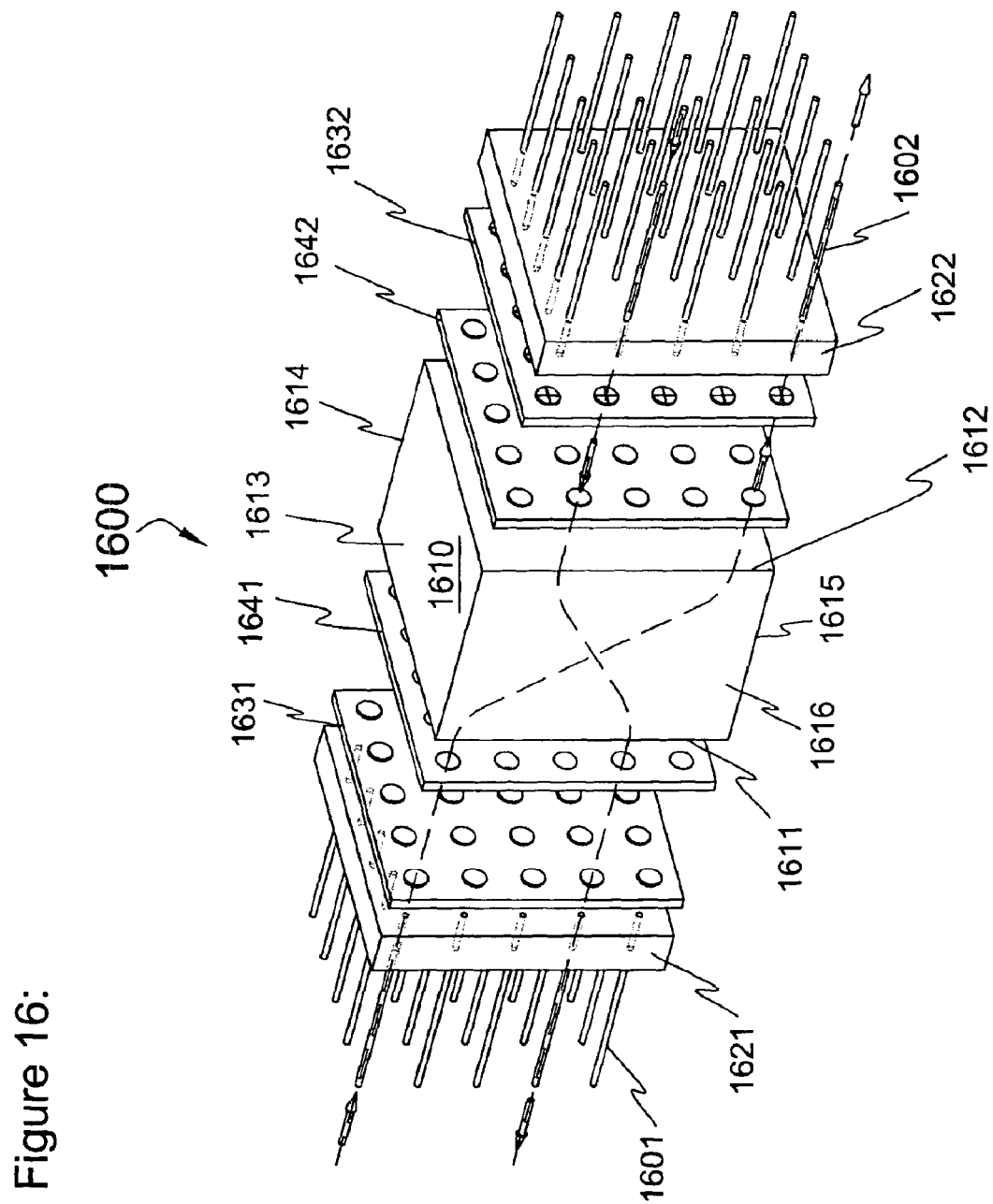
FIG. 16 shows one implementation of a fiber system which optically couples a first fiber array to a second fiber array through an optical processing module.

FIG. 16 shows one implementation of a fiber system 1600 which optically couples a first fiber array 1601, which is typically 2 dimensional, to a second fiber array 1602, which is also typically 2 dimensional, through an optical processing module 1610. The optical processing module 1610 has two interfacing openings 1611 and 1612 to interface with the fiber arrays 1601 and 1602 through free space, respectively. The optical processing module 1610 may be implemented in various forms, including optical cross-connect switches, wavelength division multiplexers, optical add-drop multiplexers, and wavelength routers.

The fiber arrays 1601 and 1602 are engaged to and are held by fiber alignment modules 1621 and 1622, respectively. Each fiber alignment module may be implemented based on the structure 1400 in FIG. 14, which has two or more alignment layers 1432 and 1434 fabricated with fiber-holding channels with funnels and necks. The structure 1400 accurately defines the lateral positions and angular directions of fibers in the fiber array with respect to one another. After the fibers are adjusted to desired positions along respective fiber-holding channels, the fibers are fixed in the fiber-holding channels. The end facets of the fibers in each fiber array point to one side of the fiber alignment module which faces the corresponding interfacing surface 1611 or 1612.

It is desirable to keep optical axes of all fibers parallel with one another in order to maintain pointing accuracy of all fibers. Moreover, it is desirable for the end facets of the fibers to be substantially perpendicular to the optical axes of the fibers. Such perpendicular end facets may be formed by first placing fibers in a linear array of V grooves in a substrate and holding the fibers in place by mechanical clamping. Next, wire lapping or dicing may be used to cut the fibers to form the desired end facets. Alternatively, laser cutting, e.g., with a short-wavelength laser such as an excimer $F_2$ laser, may also be used to cut the fibers. In other cases, cleaving of fibers before assembly into fiber alignment module is adequate. The perpendicular end facet ensures that the optical axis of the fiber is also the optical axis of light after light exits from the fiber so that the lens array can collimate light beams to be parallel to one another.

In general, optical coupling into a fiber needs a collimator lens to achieve a high coupling efficiency. Conversely, the output beam from a fiber that is directed through free space to a receiving element also needs a collimator lens to correct the divergence of the beam exiting the end facet of the fiber to allow for free-space propagation to the receiving element. Therefore, the fiber system 1600 includes two collimator lens arrays, a first lens array 1641 located between the first fiber array 1601 engaged to the fiber alignment module 1621 and the first interfacing opening 1611 of the module 1610, and a second lens array 1642 located between the second fiber array 1602 engaged to the fiber alignment module 1622 and the second interfacing opening 1612 of the module 1610. The lens arrays 1641 and 1642 may be formed of either refractive optical elements or diffractive optical elements.

Additionally, position-sensing detector arrays 1631 and 1632 may be optionally positioned relative to the fiber alignment modules 1621 and 1622 to measure a position of each beam incident onto the receiving facet of a receiving fiber. Each detector array has an array of position-sensing detectors respectively corresponding to the fibers in a respective fiber array. Both detector arrays 1631 and 1632 are needed for a bi-directional system 1600 where signals can be received either from the fiber array 1601 or 1602. If the system 1600 is a uni-directional system with light propagating from fibers 1601 to fibers 1602, then only one detector array 1632 on the receiving side with the fiber array 1602 is needed and the other detector array 1631 may be omitted. In operation, each position-sensing detector responds to the received optical beam to produce a detector output signal with spatial information of the beam on the detector surface. This detector output signal is fed into a servo control module for the optical processing module 1610 to adjust the optical elements of the module 1610 that affects the direction of the received beam to align the beam to the center of the receiving facet. In the example of a cross-connect switch, reflectors in optical switches in the signal path are adjusted. Hence, the position-sensing detector array allows implementation of an active feedback control of optical alignment of the output beam to ensure consistent performance and reliable operation of the system, such as minimized insertion losses and cross talk. Each detector array may be located in the optical paths of the signals as shown in FIG. 1 or located out of the optical paths of the signals by using a beam splitter to split a small fraction of the signals to the detector array as shown in FIG. 7(a).

The optical processing module 1610 generally interfaces with the fiber arrays 1601 and 1602 via free space through the interfacing openings 1611 and 1612. Side surfaces such as 1613, 1614, 1615 and 1616 can be hermetically sealed with transparent surfaces 1611 and 1612 to protect the internal components of the module 1610, such as mirrors and actuators or optical filters. The interfacing surfaces 1611 and 1612 are transparent to the data light and registration light when it is used.

One aspect of this application is the use of two monolithic lens arrays 1641 and 1642 to close up and hermetically seal the interfacing openings 1611 and 1612, respectively, in certain implementations. Each lens array may be formed on a planar substrate or plate, e.g., lenses may be etched from a substrate of a glass, silicon, GaP, ZnSe, or other suitable materials. The edges of the lens array may be shaped to conform to or to cover the edges of the corresponding opening 1611 or 1612. The hermetical seal may be formed between the edges of the lens array and the opening. In one implementation, the material for the housing of the module 1610 and the material for the lens arrays 1641 and 1642 may be selected for hermetic sealing. For example, the housing of the module 1610 may be formed of a metallic material such as Kovar for matching the thermal expansion coefficient with a glass material, and the lens arrays 1641 and 1642 may be formed of a glass material so that the glass-to-metal hermetic seal may be formed.

Alternatively, the fibers may be metallized and are hermetically sealed to metallized silicon plates by soldering. The metallized silicon plates are then bonded by soldering to the hermetic housing of the module 1610 to form the hermetic seal.

In some situations, it may be desirable to hermetically seal only module 1610 and in those cases glass windows 1611 and 1612 can be hermetically attached to the walls of the module 1610 while fiber arrays 1601 and 1602 and lens arrays 1641 and 1642 are kept outside of the hermetic box 1610. In other situations, hermetic sealing is not required.

Figure 17:
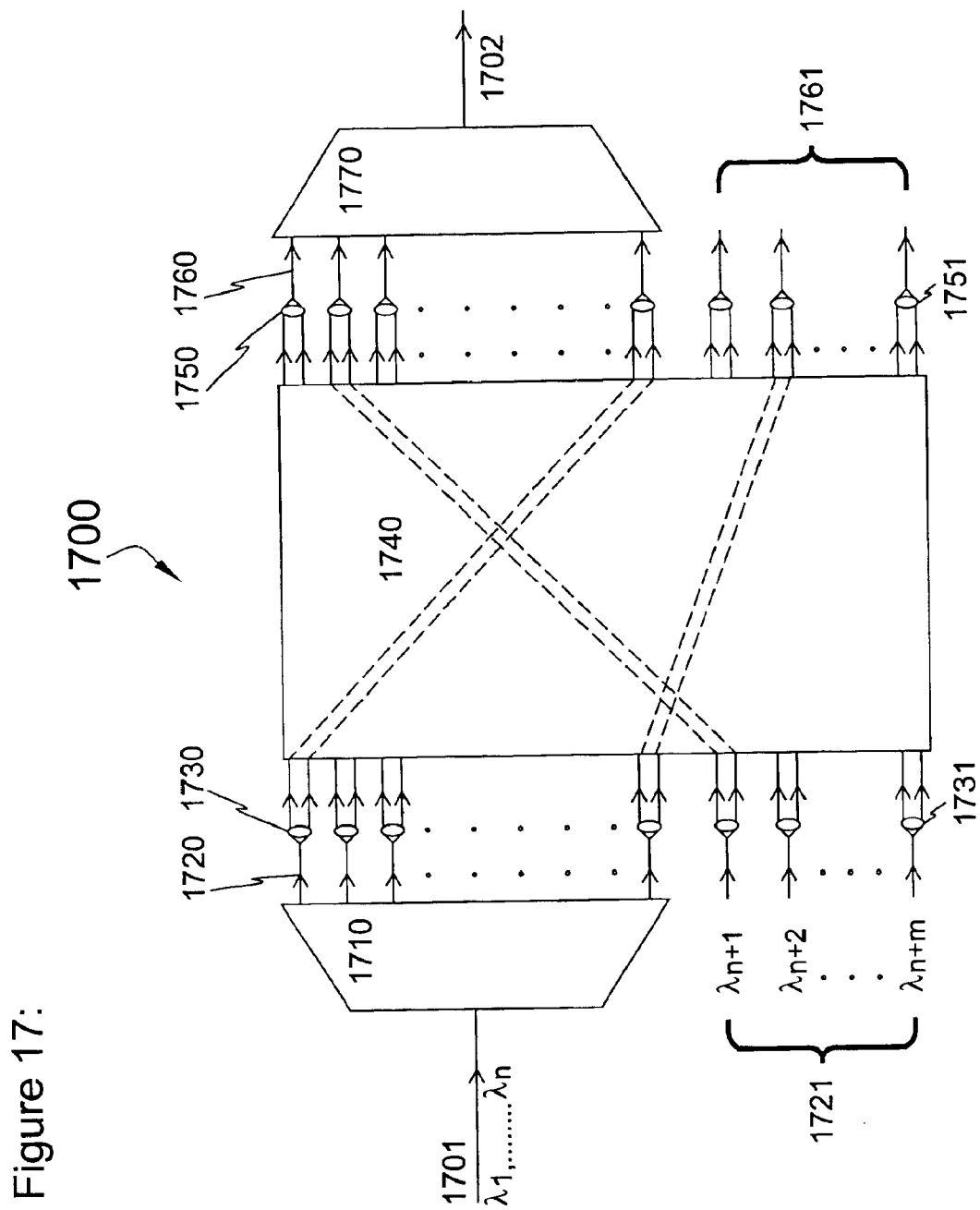
FIG. 17 shows one implementation of a reconfigurable optical add drop multiplexer with an optical cross connect switch in combination with wavelength division demultiplexer and multiplexer.

FIG. 17 shows another use of fiber and lens arrays in a reconfigurable optical add drop multiplexer (ROADM) module. Multiple channels of data are carried out on multiple wavelengths in each optical fiber. Light exiting from a single fiber 1701 is coupled into the wavelength division demultiplexer (WDM) 1710 that separates lights with different wavelengths λ1, . . . λn so that they exit at slightly different positions from the de-multiplexer 1710. One implementation of the demultiplexer 1710 is the arrayed waveguide grating (AWG) that separates the light into individual wavelengths with n waveguides of slightly different optical paths. Another implementation of WDM is the echelle or free space propagation diffraction grating. The light exiting from the AWG is coupled into array of fibers 1720. Light exiting from fibers 1720 is collimated with the lens array 1730 so it can propagate through switching matrix 1740. Signals that are supposed to be added are brought on fibers 1721 and are collimated with lenses 1731 into the switching matrix 1740. The switching matrix 1740 directs any incoming signals 1701 to any outgoing channel 1760 as schematically shown in FIG. 17. In addition, the switching matrix 1740 directs signals that are to be dropped into drop fiber channels 1761. The added signals 1721 are directed to channels 1760. Passed signals 1760 and added signals 1760 can be multiplexed with multiplexer 1770 into the single output fiber 1702. The multiplexer 1770 can be the same as or similar to demultiplexer 1710 described above. Light is coupled into the outgoing fibers 1760 with the lens array 1750. The switching matrix 1740 may be hermetically sealed. The fibers 1720 and 1721 and lenses 1730 and 1731 and fibers 1760 and 1761 and lenses 1750 and 1751 can be included in the hermetic package or can be kept outside of hermetic assembly. The hermetic sealing options discussed above for the system in FIG. 16 are applicable to this system.

Another example of the use of fiber-sensor-lens array structures is the wavelength router that combines the features of the optical cross connect (OXC) and the WDM by splitting light into individual wavelengths and then directing them into selected outgoing fibers with the use of 2D or 3D OXC's. Multiple units of fiber and WDM can be combined with OXC, lens array and optional sensor array to form wavelength router in which individual output fibers can each carry up to n wavelengths.

Figure 18:
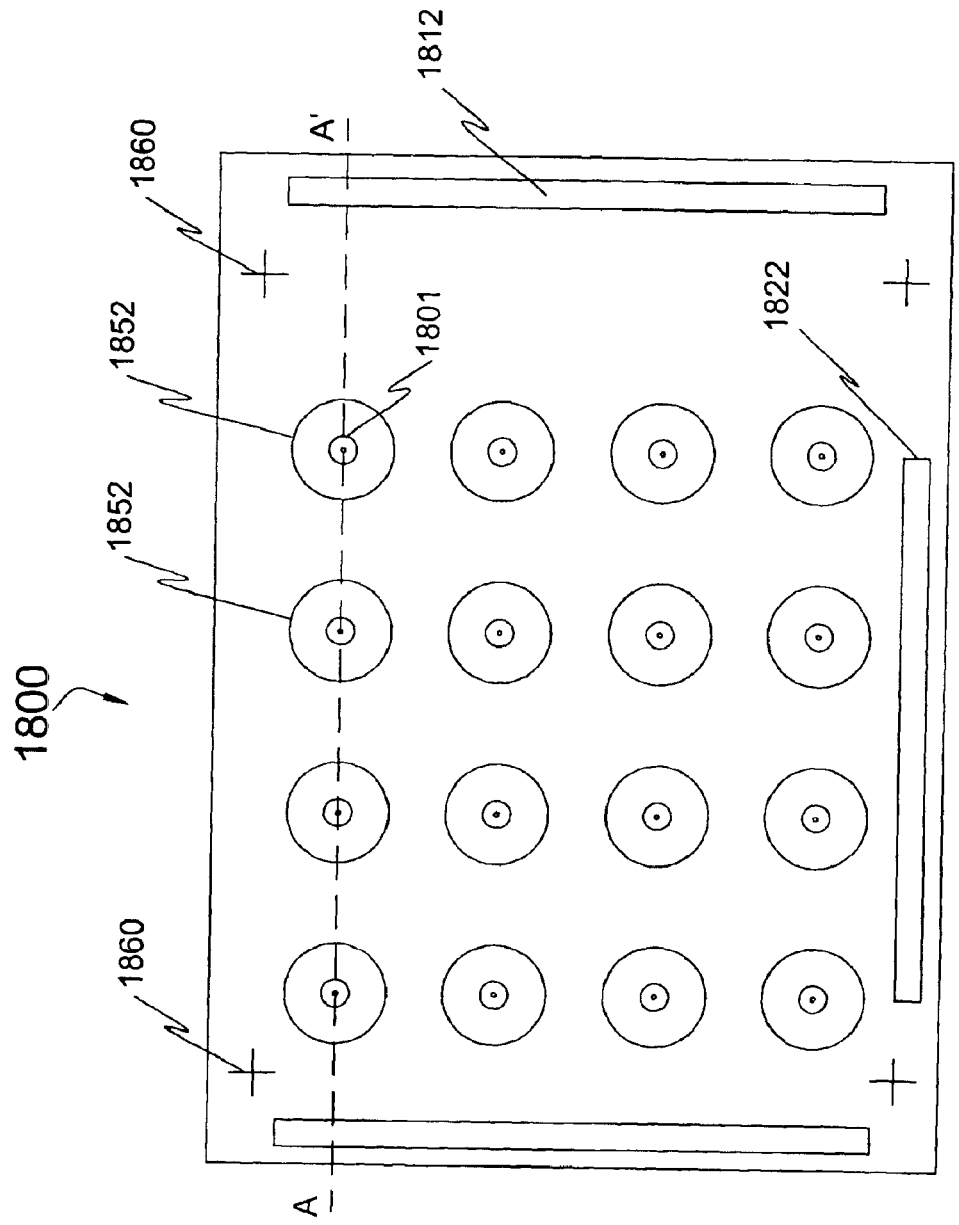
FIGS. 18 and 19 show an implementation of integrating an array of fibers in a fiber alignment module with a lens array.
Figure 19:
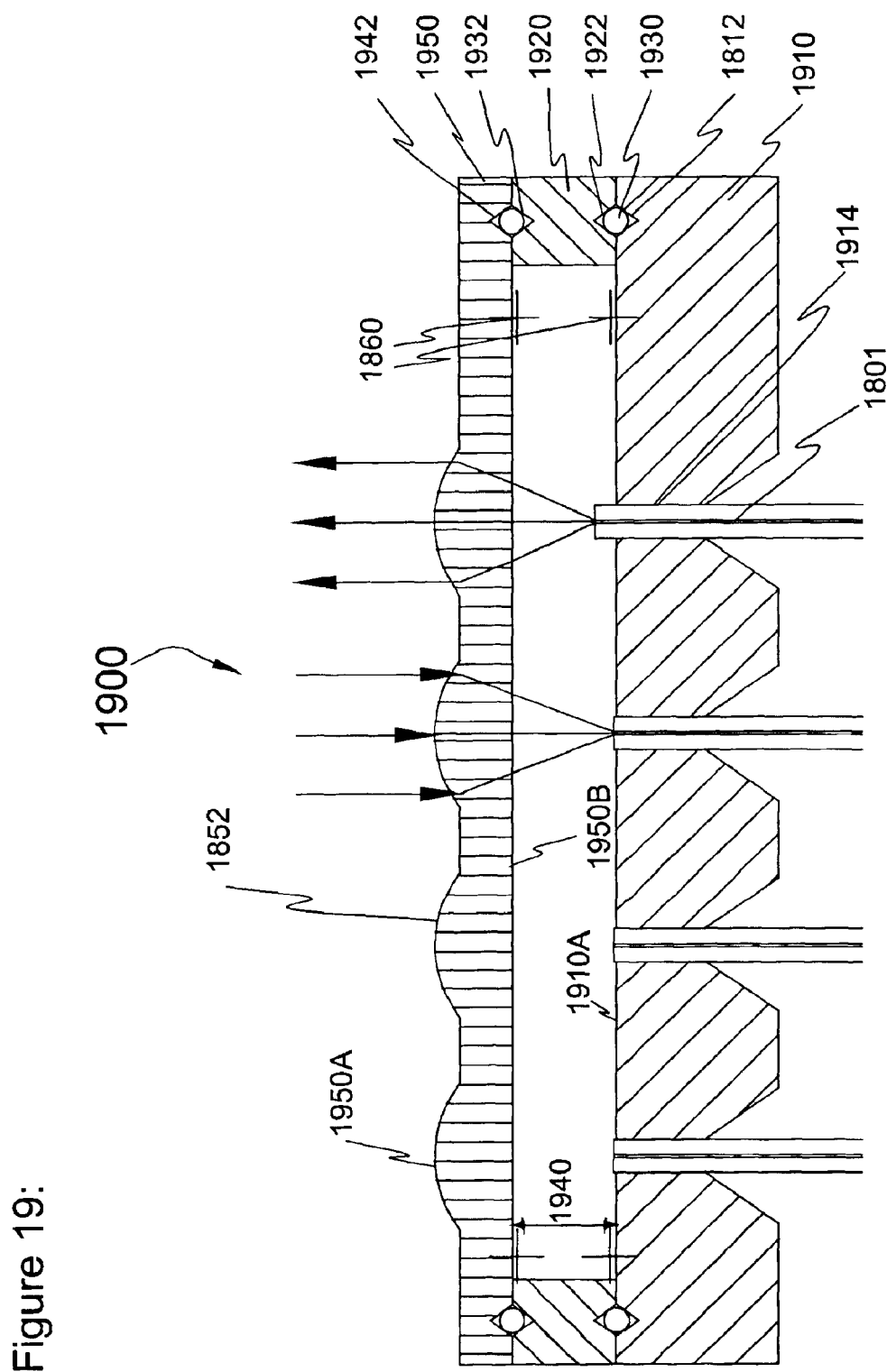

FIGS. 18 and 19 illustrate one method of integrating an array of fibers 1801 in a fiber alignment module 1810 to a lens array 1850 according to one implementation. FIGS. 18 and 19 are top and side views of the aligned fiber-lens system. Side view in FIG. 19 is taken along the line AA' in FIG. 18. As illustrated, the in plane alignment grooves 1812 and 1822 may be present in two different directions, e.g., orthogonal directions, to define the aligned position. The fiber alignment module 1810 includes a fiber-holding plate which has an array of neck-funnel channels 1814 penetrating the plate. The relative positions of the channels 1814 are designed to define the relative lateral positions of the fibers 1801. Each channel 1814 is sized to receive a corresponding fiber 1801 with a tight fit but allows for adjusting the position of the fiber 1801 along the channel. The exposed, bare fibers 1801 are inserted into the corresponding channels 1814.

The lens array 1850 may be formed from a single piece of optically transparent material in the wavelength of interest, such as a silica, glass, plastic, silicon, gallium phoshide, zirconium oxide, etc. by well known methods of photoresist reflow or gray scale photolithography and dry etching. One surface 1850A or the two opposite surfaces 1850A and 1850B may be shaped to form the lens array. In the illustrated implementation, the top surface 1850A is shaped to have an array of curved and protruded areas 1852 to form and define individual convex lenses while the opposite surface 1850B is substantially planar. The spacer 1820 may be used to provide a desired spacing between the lens array 1850 and the array of fibers 1801 to ensure the end facet of each fiber 1801 is approximately at or near the focal plane of the corresponding lens in the lens array 1850. The spacer 1820 may be formed between the planar bottom surface 1850B of the lens array 1850 to create a space 1840 between the lens array 1850 and the fiber alignment module 1810. This space 1840 may be used to accommodate the fibers 1801 that extend beyond the fiber alignment module 1810. Since the lensing effect of the lens array 1850 of the illustrated implementation is effectuated by the top surface 1850A, an index-matching dielectric material such as an index-matching liquid may be filled in the space between the fiber alignment module 1810 and the planar bottom surface 1850B to reduce optical reflection at the bottom surface 1850B. The top surface 1850A may be coated with an anti-reflective coating to reduce the reflection. Alternatively, space 1840 is left unfilled and fiber facet surface and two lens surfaces 1850A and 1850B are coated with antireflective films. Also, the surfaces of fibers are normally coated with antireflective layers in order to minimize back reflections and reduce insertion loss.

One technical issue in assembling the structure in FIG. 18 is lateral alignment of fibers 1801 to the optic axes of the corresponding lenses 1852, respectively. In the illustrated implementation, this lateral alignment may be achieved by using pre-formed alignment marks (e.g., 1860) and grooves (e.g., 1832 and 1842). Alignment marks may be formed in the lens array 1850 and the fiber alignment module 1810 as alignment references. The lateral positions of the lens array 1850 and the fiber alignment module 1810 may be adjusted relative to each other to align up the alignment marks. When alignment features such as grooves 1832 and 1842 are present, passive alignment is achieved between fiber array 1810 and lens array 1850.

Passive alignment of fiber and lens arrays can be accomplished by using alignment features 1B12 and 1822 in fiber array plate and the spacer 1820 between lens array assembly 1850 and fiber array assembly 1810, respectively. Alignment features 1812 and 1822 can be in-plane V grooves that are photolithographically defined and etched in the silicon or other substrates with high precision. Fiber array plate 1810, the spacer 1820, and the lens array 1850 can be aligned by inserting bare alignment fibers 1830 into the common grooves formed by aligned alignment features in two opposing surfaces of two different layers. For example, the alignment feature (V groove) 1822 on the bottom surface of the spacer 1820 is aligned with the alignment feature (V groove) 1812 on the top surface of the plate 1810 with the neck-funnel features to form a channel for inserting an alignment fiber 1830 to force the alignment between the spacer 1820 and the plate 1810. Similar alignment features on the lens array 1850 and the spacer 1820 are used along with alignment fibers to facilitate alignment between the lens array 1850 and the spacer 1820. As a result, the lens array 1850 and the fiber array fixed in the plate 1810 are aligned with respect to each other.

In the illustrated implementation, the top surface 1810A of the fiber alignment module 1810 is designed to have triangular cross section grooves or pyramidal holes 1812 (e.g., V grooves or holes formed in silicon substrates with precisely defined angles) which are sized to receive a portion of a cylindrical rod with precise uniform diameter and minimal excentricity (such as optical fiber ) or uniform diameter spheres while exposing another portion of the same rod or sphere above the surface 1810A. The spacer 1820, which is engaged to and is affixed to the lens array 1850 and fiber array 1810, is designed to have grooves 1832 on the top surface that match the grooves 1872 in the lens array 1850 and grooves 1822 on the bottom surface that match the grooves 1812 in the fiber array. Top and bottom alignment grooves 1832 and 1822 are formed in the spacer 1820 using double sided photolithography.

In the alignment process, an alignment rod 1830 can be bonded or mechanically clamped to each alignment groove 1812 on the surface 1810A. The assembly of the lens array 1812 and the spacer 1820 is positioned over the fiber alignment module 1810 to overlap the corresponding matching fiber groove 1822 to the alignment rod 1830. Since a portion of the alignment rod 1830 protrudes above the surface 1810A, the protruded portion of the alignment rod 1830 can be received by the groove 1822 to force the assembly of the lens array 1850 and the spacer 1820 into the preset aligned position. Alignment of grooved spacer 1820 and lens array can be automatically accomplished by bonding silicon spacer 1820 with V grooves to plate 1850. This can simplify the alignment process, reduce the assembly time, and ensure alignment accuracy. Alternatively, precise silicon balls may be used to replace the alignment rods. Another alternative relies on active alignment of fiber array and lens array using photolithographically defined alignment marks 1860 on surfaces 1810A and 1850B.

Figure 20:
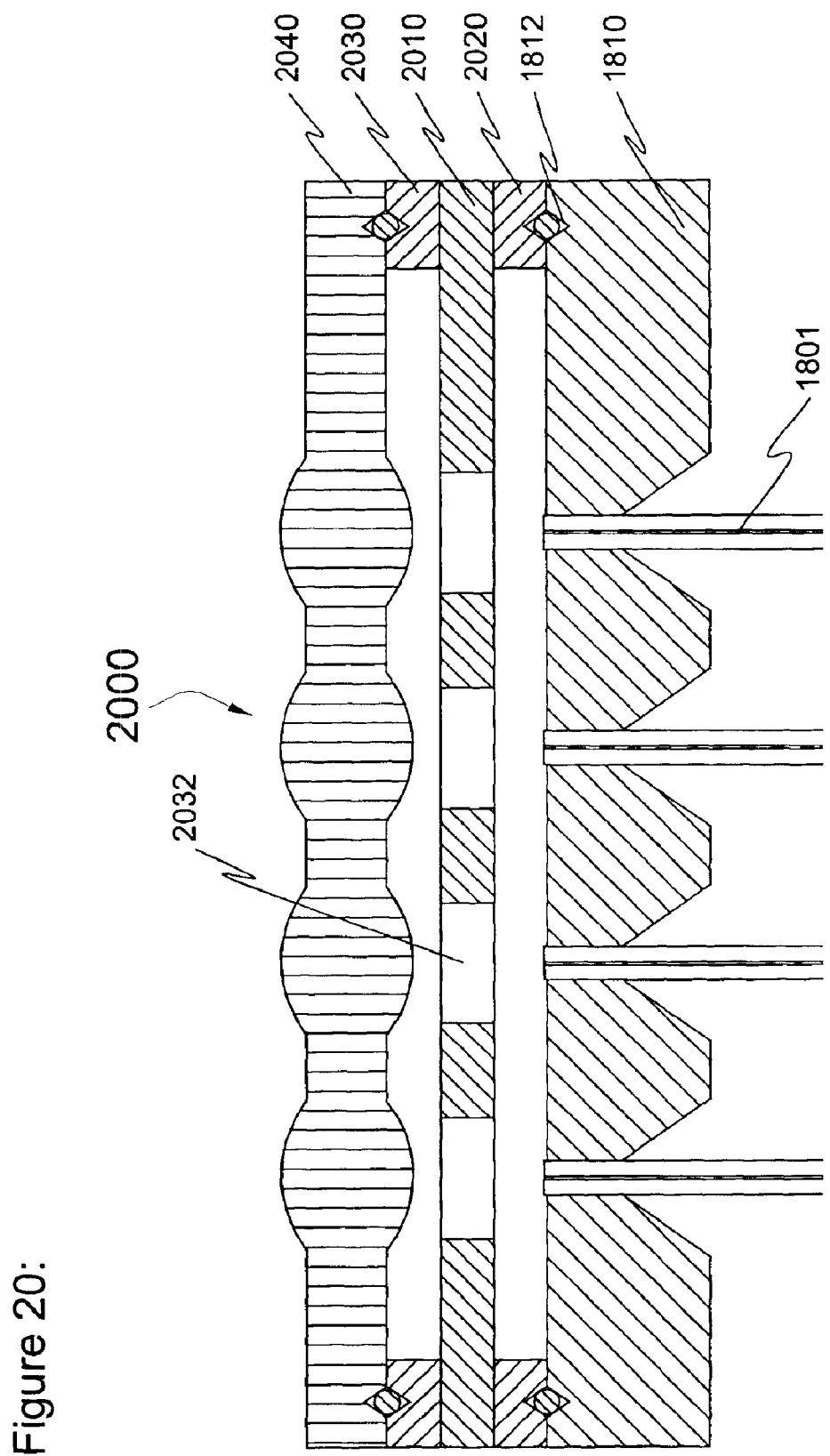
FIG. 20 shows another example of an integrated fiber array where a position-sensitive detector array is positioned between the lens array and the fiber alignment module.

FIG. 20 shows another implementation of an integrated fiber array where a position-sensitive detector array 2010 is positioned between the lens array 2040 and the fiber alignment module 1810. The detector array 2010 has an array of position-sensing detectors 2032 to measure lateral position of each beam passing through it. Two spacers 2020 and 2030 are used between the fiber alignment module 1810 and the detector array 2010, and between the lens array 2040 and the detector array 2010, respectively. As illustrated, alignment marks and alignment grooves may also be used to assist the alignment.

The lens array 2040 in FIG. 20 is different from the lens array 1850 in that the bottom surface is also shaped to have curved and protruded areas to effectuate the focusing effect. This design with two curved surfaces can be used to achieve a long focal length to place the beam waist of a Gaussian beam at the center of the optical path within the optical processing module 1610 shown in FIG. 16 and the distance between each lens array to the beam waist is within the Rayleigh length so that the divergence of the Gaussian beam does not exceed the optical aperture of each lens. This design can reduce the optical loss. Note that the index-matching liquid may not be filled in the space between the fiber alignment module 1810 and the lens array 2040 because this would nullify the focusing effects of the curved areas on the bottom surface of the lens array but antireflective coating may be used.

The above use of alignment grooves for lateral alignment may be extended to alignment of different substrates is or chips associated with the array of fibers. Referring back to FIG. 14 where a neck-funnel alignment structure is illustrated, different layers with fiber-guiding channels or through holes must be aligned with respect to one another with a high accuracy, especially when the number of layers is large.

Figure 21:
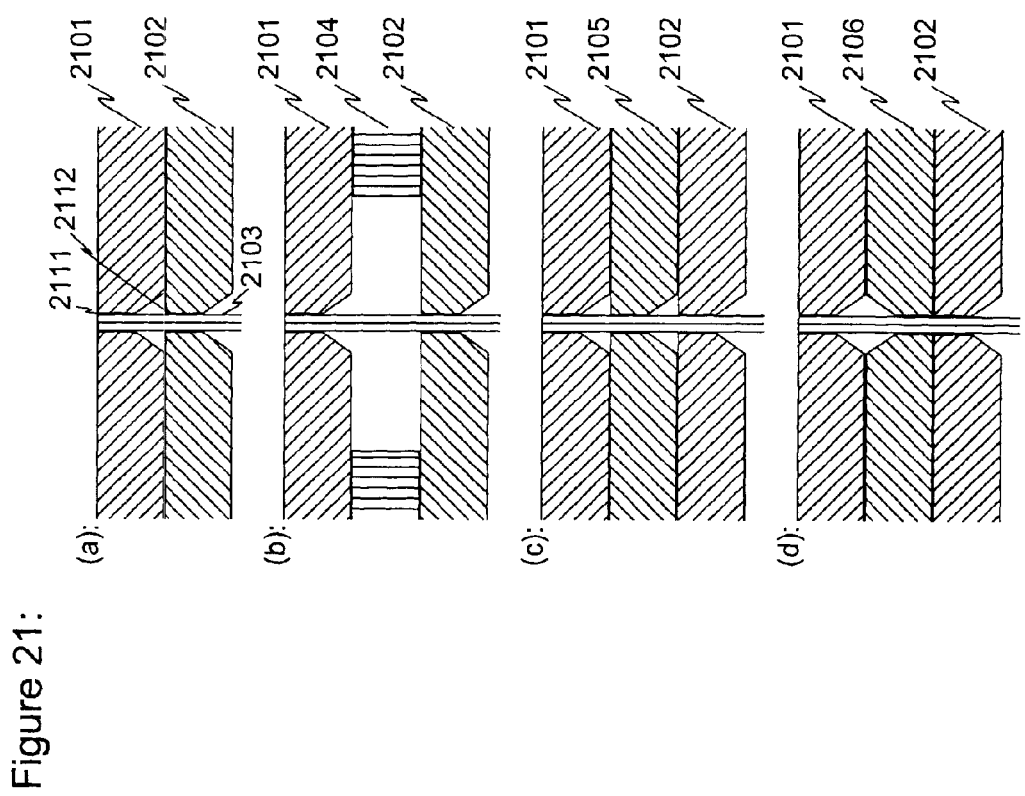
FIGS. 21(a), (b), (c) and (d) show different assemblies of fiber alignment plates.

Notably, the alignment design in FIG. 14 by using two or more alignment plates with the neck-funnel structures is only one exemplary design. Other arrangements of alignment plates with the neck-funnel structures are also possible and may be used. FIG. 21 shows four different exemplary arrangements having at least two alignment plates with the neck-funnel structures. FIG. 21(*a*) shows two alignment plates 2101 and 2102 are directly stacked over each other in a funnel-neckfunnel-neck arrangement when viewed from the plate 2102 towards the plate 2101. No spacer is used between the two alignment plates 2101 and 2102. FIG. 21(*b*) shows a funnel-neck-funnelneck arrangement with a spacer 2104 between the two alignment plates 2101 and 2102. This design is a simplified design in comparison to the design in FIG. 14. FIG. 21(*c*) shows a three layer design with a funnel-neck-funnel-neck-funnel-neck arrangement from the plate 2102, to plate 2105, and to plate 2101 without any spacers. Finally, FIG. 21(*d*) shows three alignment plates 2101, 2106, and 2102 in a funnel-neck-neckfunnel-funnel-neck arrangement going from the plate 2102 to the plate 2106 and to the plate 2101.

Figure 22:
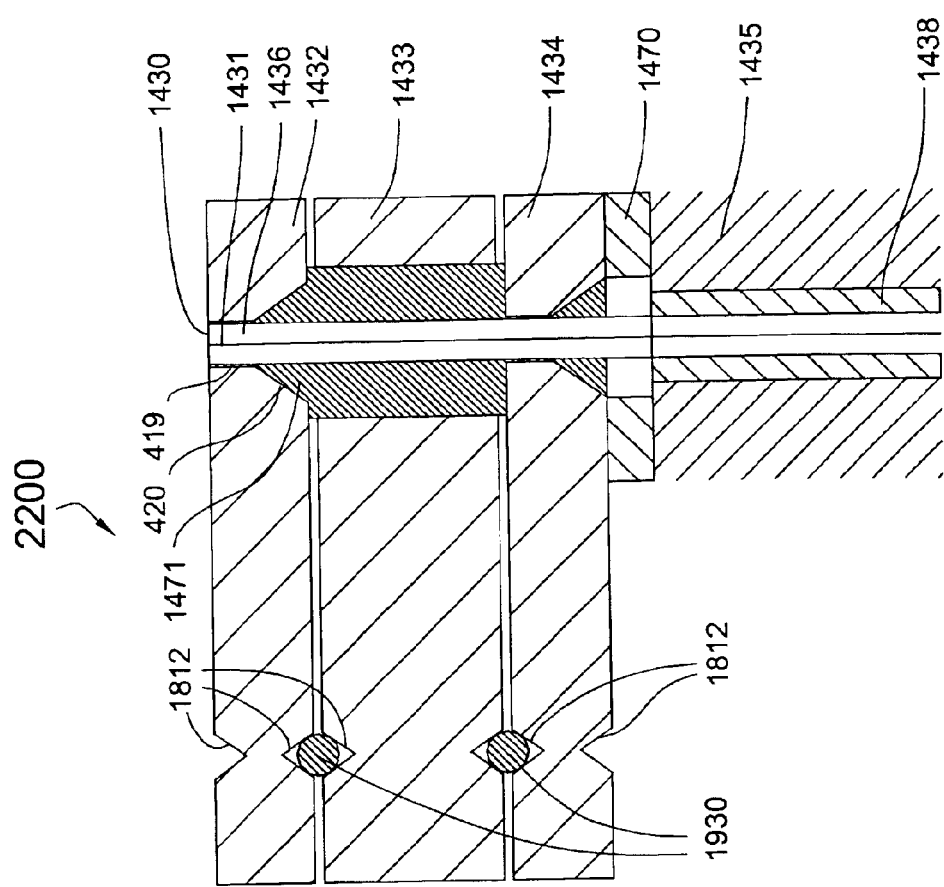
FIG. 22 shows a fiber alignment module having funnel neck structure and alignment grooves with alignment rods in alignment plates.

FIG. 22 shows that each layer may be designed to have the alignment grooves 1812 for aligning with an adjacent layer in an alignment module shown in FIG. 14. This may be applicable to the examples shown in FIG. 21 and other variations and modifications.

In addition to laterally positioning the fibers in the fiber array, the position of each fiber along the fiber channel can be individually adjusted to ensure the proper focusing distance between the fiber end facet and the corresponding lens in the lens array. This is because fabrication of the individual lenses in the lens array usually has inherent inaccuracies in focal length and other variations from one lens to another. Optical collimation essentially requires each fiber end facet to be at or near the focal plane of its collimator lens. Therefore, different fibers may be adjusted to have their end facets at different positions from the lens array. This adjustment may be achieved after the lateral alignment of the lens array with fiber array is completed.

In operation, each fiber is individually adjusted by applying a force to slide its position in the fiber channel of the fiber alignment module. The degree of collimation is optically monitored to determine whether the end facet of each fiber is set to the desired position. Referring back to FIG. 18, different fibers may be set to have different amounts of protrusion out of the fiber alignment module as a result of this adjustment. A high resolution imaging camera may be used to monitor the alignment.

In a 1-Dimensional fiber array, at least two fibers may be adjusted together at a time until all fibers are adjusted to be at their desired focus positions. In a 2-Dimensional fiber array, at least three fibers may be adjusted together at a time until all fibers are adjusted to be at their desired focus positions.

When lens array has lenses with very tightly controlled focal lengths, adjustment of fiber positions along their optical axes is not necessary and fibers can be bonded to fiber alignment structure before fiber array and lens array are aligned and attached together.

Figure 23:
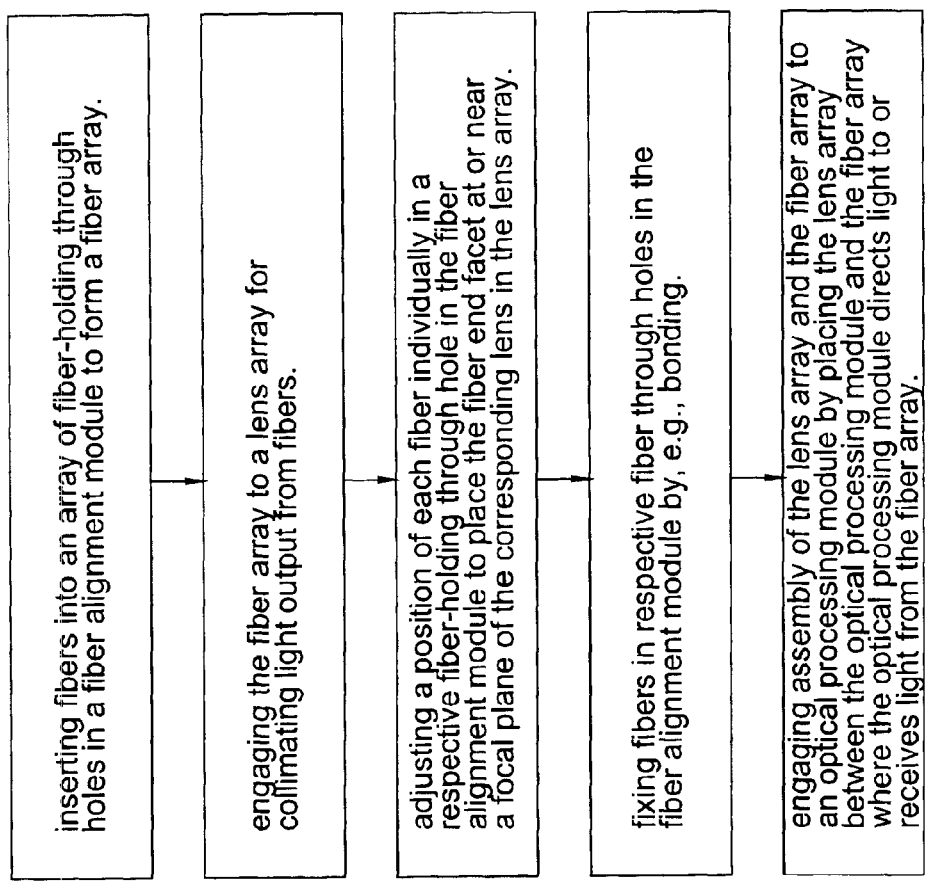
FIG. 23 shows one exemplary operational flow for assembly of the systems shown in FIGS. 16 and 17.

FIG. 23 shows one exemplary operational flow for assembly of the systems shown in FIGS. 16 and 17. In this implementation, the assembly of the lens array and the fiber array is completed first and then the entire assembly is engaged to the optical processing module. Referring back to FIGS. 19, 20 and 22, alignment fiber grooves are used in putting different layers in the fiber alignment module together and in laterally aligning the lens array to the fiber array. Finally, the lens array may be formed from a single piece of a substrate and may be engaged to the optical processing module by hermetically sealing to protect the components inside the optical processing module.

Referring back to FIGS. 16, 17, and 20, a position sensitive detector array may be formed on the fiber end facets to measure positions of beams. FIGS. 10(*a*)–10(*c*) illustrate one implementation with quadrant detectors.

FIG. 24 shows another implementation with quadrant detectors in an assembly of a lens array and a fiber array. The quadrant detector array has an array of quadrant detectors 2412 formed on a substrate 2410 formed of silicon, germanium, InGaAs, InP, or other suitable materials. Different from the implementation in FIG. 10(*c*), no aperture is formed in the silicon substrate 2410 because silicon is essentially transparent for the infrared light used in fiber communications.

Figures 25A, 25B:
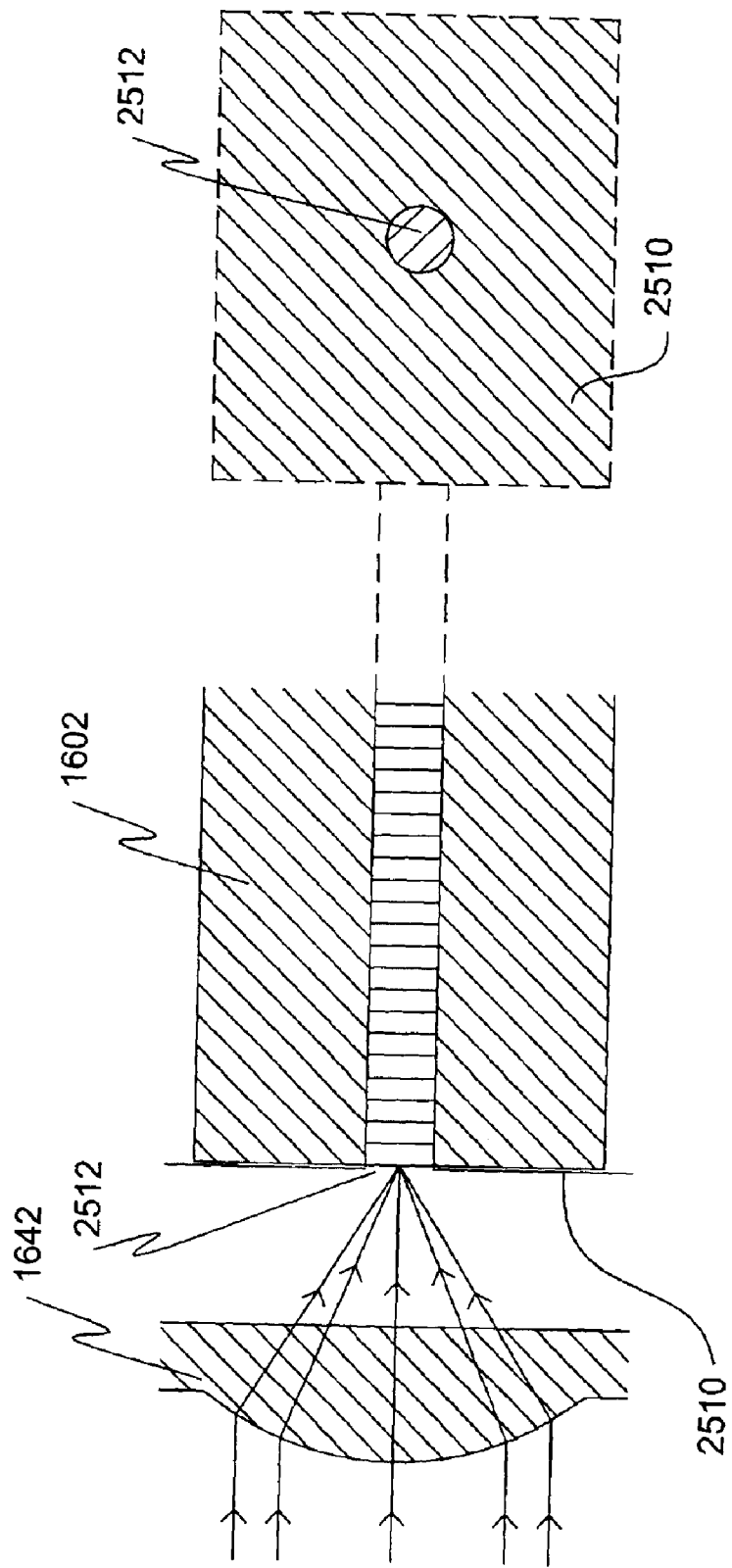
FIG. 25 includes FIGS. 25a and FIG. 25b which shows one implementation of the optical reflector formed on the end facet of each fiber with a central aperture to transmit light.

FIG. 25 shows two different views of one implementation of the optical reflector 2510 formed on the end facet of each fiber with a central aperture 2512 to transmit light. The figure on the left shows the side view and the figure on the right shows the cross sectional view. The reflector 2510 is used for the system shown in FIG. 7(*a*) where a beam splitter 702 and a position sensitive detector array 110 are used to measure positions of beams on the fibers by placing the detector array outside the main optical paths of the signal beams. The reflector 2510 may be a reflective coating such as gold film with titanium or chromium adhesion layer.

Figure 26:
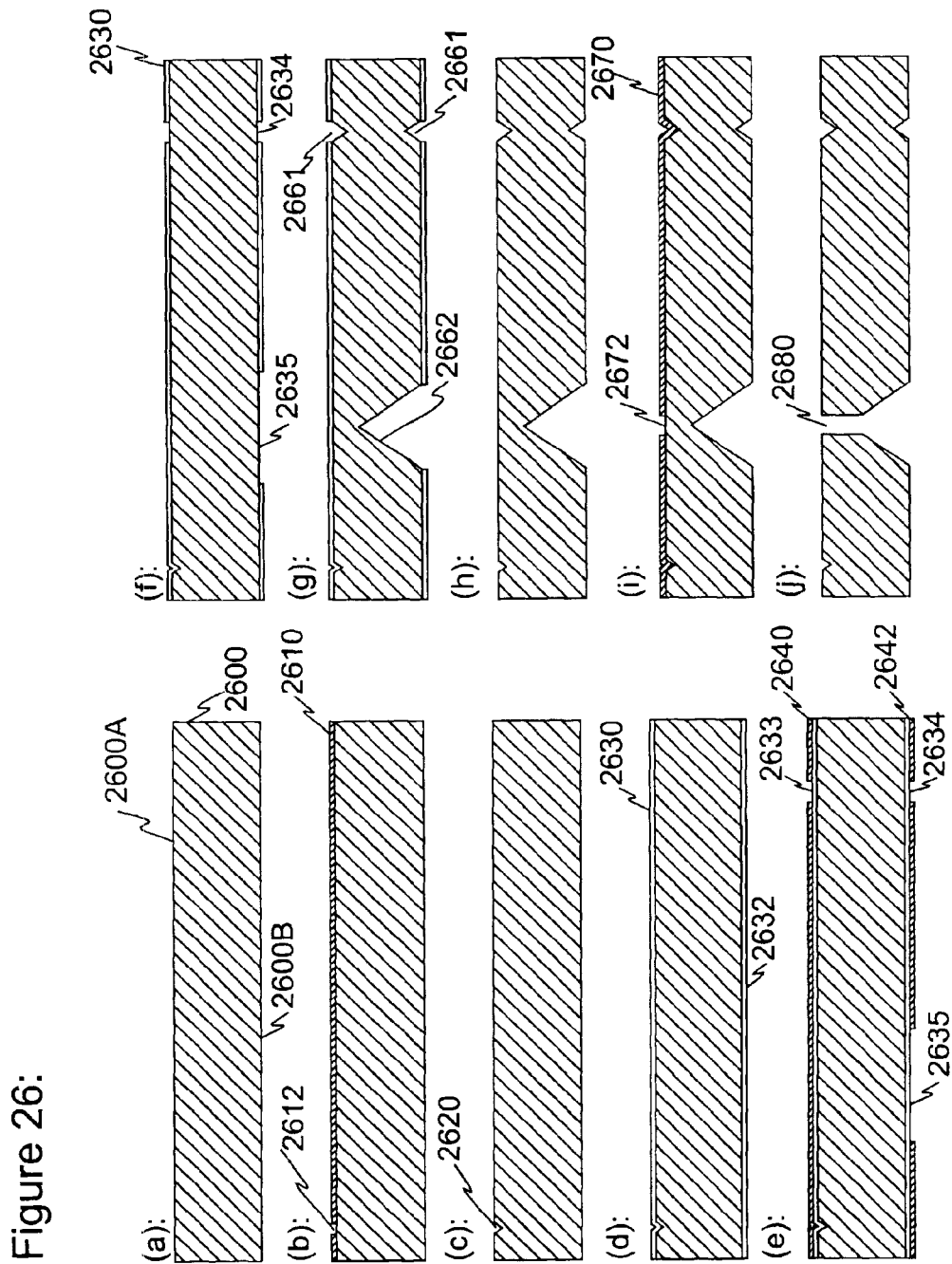
FIG. 26 shows the fabrication steps and the associated structure of an alignment layer with alignment grooves used in the fiber alignment module shown in FIGS. 19 and 20.

FIG. 26 shows the fabrication steps of an alignment structure with alignment grooves used in the fiber alignment module shown in FIG. 19, 20, or 22. A silicon substrate 2600 is prepared to have a top surface 2600A and a bottom surface 2600B. A photoresist layer 2610 is formed on the top surface 2600A to define locations 2612 for alignment marks. Etching of substrate forms alignment marks 2620 on the surface 2600A. The photoresist is removed before both surfaces 2600A and 2600B are coated with an oxide layer (e.g., $SiO_2$) or a nitride layer (e.g., $Si_3N_4$) to form the protection layers 2630 and 2632. The layers 2630 and 2632 are patterned with features 2634 and 2635. Features 2634 define alignment grooves and features 2635 define the tapered funnels of the fiber-holding channel. The silicon substrate 2600 is then etched by e.g., a wet etching process, to form alignment grooves 2661 and the tapered funnels 2662. The protection layers 2632 and 2630 are then removed. Finally, a photoresist 2670 is patterned on the surface 2600A to define features 2672 located on the opposite side of the funnels 2662. A dry reactive ion etching is performed on the top surface 2600A to form cylindrical neck openings 2680 that connect to the funnels 2662.

Referring back to the alignment design in FIG. 22, the above alignment layer may be used to form a multilayer stack for accurate positioning of fiber cores and guiding of fibers during insertion, incorporation of fiber taper angles in two dimensional array, and self alignment of fiber, lens and sensor arrays during their assembly. Micron positioning accuracy is achieved with low fabrication and assembly cost.

The fiber 1430 contains the section of exposed fiber cladding 1439 and the section where the buffer 1438 is present. Fiber cladding 1439 is aligned and held with precision of few microns by a series of alignment layers 1432, 1433 and 1434. These layers have guiding and aligning regions. The neck regions define the positions of the fibers, and the funnel regions provide a guide for massive, parallel insertion of many fibers into the structure. Alignment layers 1432–1434 and fiber 1430 may be secured together with glass or glue bonds 1471 so that a hermetic seal is formed between the fibers 1430 and alignment plates 1432 and 1234. Glass bonding may be preferable because of thermal coefficient match between the fiber glass and bonding glass and the environmental stability of glass seal. Even low temperature glass bonding requires relatively high temperatures compared with thermal or ultraviolet curing of epoxies and therefore special insulation spacers 1470 have to be included in the alignment structures to thermally isolate buffer 1438 from alignment layers 1432–1434 during glass bonding. Multiple constricted channels or necks in the alignment layers 1432–1434 define the fiber position and also the direction of light exiting from the fiber 1430.

Properly positioned buffer 1438 provides crude positioning and strain relief for fiber 1430. Buffer alignment block 35 with tapered cylindrical holes can serve as a positioner and holder of buffer coatings. Alternatively, an approach similar to that used with fiber alignment layers can be used with buffer alignment layers. Openings in the buffer alignment block 1435 are significantly larger than the funnels and bottlenecks in the fiber alignment layers 1432–1434 in order to accommodate the larger buffer diameter. Buffer 1438 and buffer alignment block 1435 are glued together to mechanically stabilize the structure and further seal it for isolation from outside environment. Note, that preferable hermetic seal is at switching core surfaces or are formed by lens surfaces.

The overall structure can include alignment vias that go through all alignment and buffer layers. Mechanical pins, of a controlled diameter and concentricity, can be inserted into these vias to align the multilayer structure of alignment layers and buffer alignment block.

The lens array may be formed by photolithographic and etching processes from a single piece of a substrate. The lens array can be designed to have alignment features that match alignment features in the fiber alignment structure so that passive alignment can be employed to assemble these two structures in a self-aligning manner.

Figure 27:
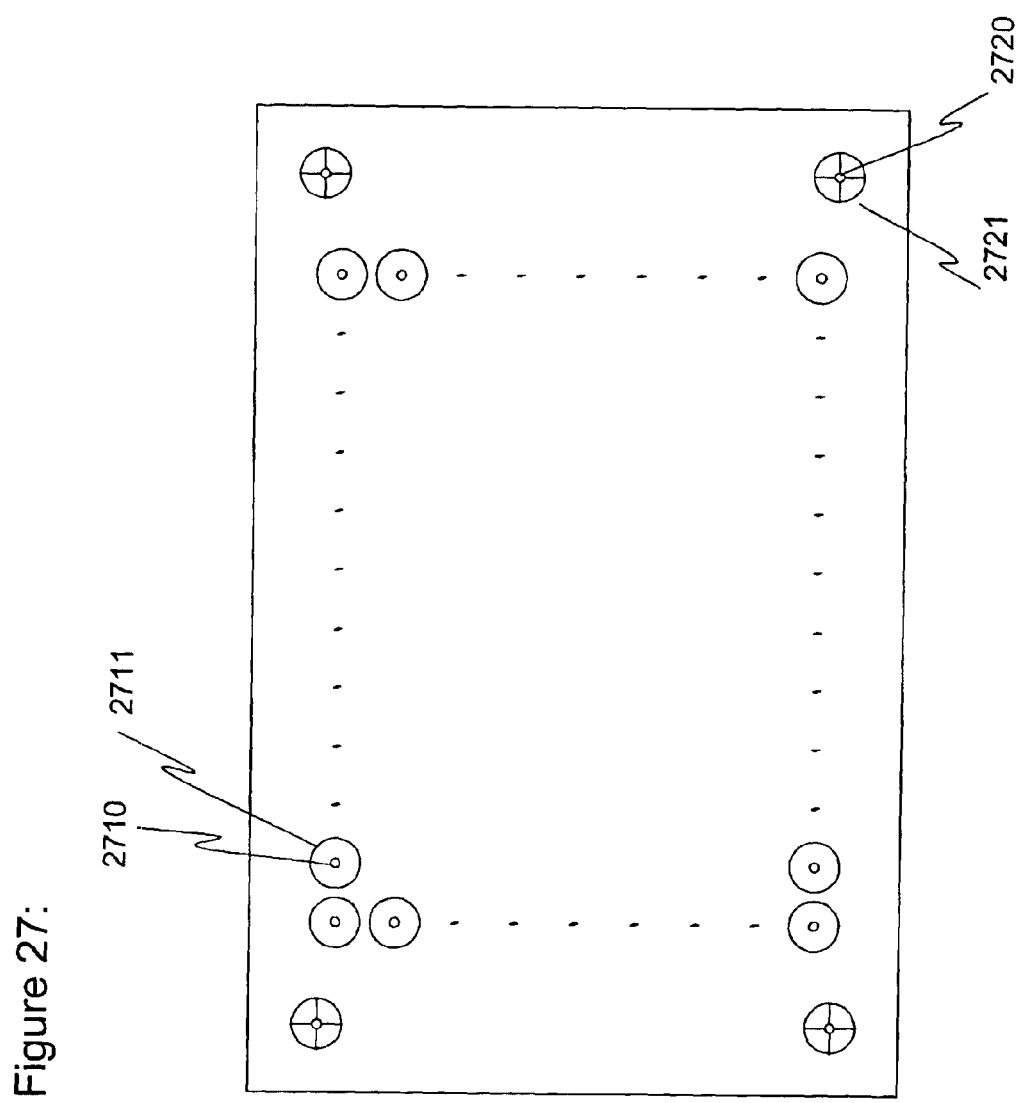
FIG. 27 shows another method of out of plane alignment between fiber alignment plates and lens array plates.

Another method of out of plane alignment between fiber alignment plates and lens array plate is shown in FIG. 27. The top view of alignment features 2720 is shown along with positions of fibers 2710 and lenses 2711. Alignment features 2720 can be formed by vias with cylindrical neck regions and tapered funneled regions 2721 as described above. The fabrication of these vias can be also as described earlier. Cylindrical rods such as optical fibers that are not part of optical fiber array can be used for alignment. Further alignment can be facilitated when light is input into these dummy optical fibers.

Assembly of fiber-sensor-lens arrays may be implemented in the following steps:

1. Assembly and alignment of fiber alignment structure using passive alignment features (e.g., V grooves).
2. Attachment of the fiber alignment structure together with adhesives or with solder when the structure is coated with metal films or with glass frit.
3. Attachment of buffer alignment block (e.g., an alignment fiber) to the fiber alignment structure.
4. Insertion of stripped fibers into the buffer alignment block and fiber alignment structure with funnel-like features facilitating the insertion.
5. Attachment of fibers to alignment structure when lens array has focal lengths in narrow range. When focal lengths variations are excessive, fibers are attached in step 10 below.
6. Antireflective coating of fiber array.
7. Antireflective coating of lens array.

8. Passive or active alignment of fiber array, optional sensor array and lens array.

9. Attachment of fiber block, sensor and lens array with materials outlined in step No. 2 above.

10. Individual adjustments of fiber position along the optical axis until the fiber facet is close to the focal points of individual lenses when lens array has excessively wide distribution of focal lengths.

11. Attachment of fibers to fiber alignment structure.

8. Other Applications

Apart from using the above described arrays as cross connect switches, other applications include the following:

a. Reconfigurable optical add-drop multiplexers. The system permits M lines to be dropped and M other lines to be added.

b. Controlled variable optical attenuators with calibrated deflections where the light beams may be intentionally misaligned to the fiber cores in order to introduce a certain amount of attenuation.

c. Compensation of polarization mode dispersion.

Only few implementations are disclosed. However, is understood that variations and enhancements may be made without departing from the spirit of and are intended to be encompassed by the following claims.

What is claimed is:

1. A device, comprising:
    a plurality of fibers to guide light;
    a fiber alignment module having an alignment plate with an array of fiber-holding through holes to hold said fibers in desired positions and in parallel to form a fiber array;
    an optical processing module located in a path of said light to process light and to direct light to or receive light from said fiber array; and
    a lens array located between and engaged to said fiber alignment module and said optical processing module, said lens array having a plurality of lenses formed in a single substrate to collimate light from said fibers in said fiber array and to focus light to said fibers in said fiber array;
    wherein said fiber alignment module includes at least two alignment plates having interfacing surfaces with matching in plane alignment features aligned with one another, and alignment members each of which is inserted between one pair of said matching in plane alignment features.

2. The device as in claim 1, wherein said alignment members include alignment rods or spheres placed within matching alignment features.

3. The device as in claim 1, wherein each alignment plate includes at least an alignment mark to be aligned with a matching alignment mark in another alignment plate.

4. The device as in claim 1, further comprising a spacer engaged between said lens array and said fiber alignment module to provide a proper focusing distance between said lens array and said fiber array.

5. The device as in claim 1, wherein end facets of said fibers and lens surfaces of said lenses are coated with an antireflective coating to reduce optical reflection.

6. The device as in claim 1, further comprising a second set of fibers, a second fiber alignment module having a second alignment plate with through holes to hold said second set of fibers in an array, and a second lens array to collimate light from said second set of fibers.

7. The device as in claim 1, wherein said optical processing module includes an array of mirrors with MEMS actuators.

8. The device as in claim 1, wherein said lens array is formed of an array of refractive optical elements.

9. The device as in claim 1, wherein said lens array is formed of an array of diffractive optical elements.

10. The device as in claim 1, wherein said lens array is formed of an array of graded index lenses.

11. The device as in claim 1, wherein said lens array is formed of a glass material.

12. The device as in claim 1, wherein said lens array is formed of silicon.

13. The device of claim 1, wherein the fiber array and the lens array are two dimensional arrays.

14. The device of claim 1, wherein the optical processing module includes at least one transparent window and is hermetically sealed.

15. The device of claim 1, wherein said lens array is hermetically sealed to said optical processing module.

16. The device of claim 1, where said fiber alignment module is hermetically sealed to said optical processing module.

17. A device, comprising:
    a plurality of fibers to guide light:
    a fiber alignment module having an alignment plate with an array of fiber-holding through holes to hold said fibers in desired positions and in parallel to form a fiber array;
    an optical processing module located in a path of said light to process light and to direct light to or receive light from said fiber array; and
    a lens array located between and engaged to said fiber alignment module and said optical processing module said lens array having a plurality of lenses formed in a single substrate to collimate light from said fibers in said fiber array and to focus light to said fibers in said fiber array;
    wherein said fibers are positioned to have fiber end facets at different distances from said lens array to compensate for variations in focal lengths of said lenses.

18. A device, comprising:
    a plurality of fibers to guide light;
    a fiber alignment module having an alignment plate with an array of fiber-holding through holes to hold said fibers in desired positions and in parallel to form a fiber array;
    an optical processing module located in a path of said light to process light and to direct light to or receive light from said fiber array;
    a lens array located between and engaged to said fiber alignment module and said optical processing module, said lens array having a plurality of lenses formed in a single substrate to collimate light from said fibers in said fiber array and to focus light to said fibers in said fiber array;
    a spacer engaged between said lens array and said fiber alignment module to provide a proper focusing distance between said lens array and said fiber array; and
    an index matching liquid between said lens array and said fiber alignment module to reduce optical reflection.

19. A device, comprising:
    a plurality of fibers to guide light;
    a fiber alignment module having an alignment plate with an array of fiber-holding through holes to hold said fibers in desired positions and in parallel to form a fiber array;

an optical processing module located in a path of said light to process light and to direct light to or receive light from said fiber array;

a lens array located between and engaged to said fiber alignment module and said optical processing module, said lens array having a plurality of lenses formed in a single substrate to collimate light from said fibers in said fiber array and to focus light to said fibers in said fiber array; and a spacer engaged between said lens array and said fiber alignment module to provide a proper focusing distance between said lens array and said fiber array;

wherein said spacer has in plane alignment features formed on a first surface in contact with said lens array and on a second surface in contact with said fiber alignment module to assist alignment of said lens array with respect to said fiber array.

20. A device, comprising:

a plurality of fibers to guide light;

a fiber alignment module having an alignment plate with an array of fiber-holding through holes to hold said fibers in desired positions and in parallel to form a fiber array;

an optical processing module located in a path of said light to process light and to direct light to or receive light from said fiber array;

a lens array located between and engaged to said fiber alignment module and said optical processing module, said lens array having a plurality of lenses formed in a single substrate to collimate light from said fibers in said fiber array and to focus light to said fibers in said fiber array; and a detector array located between said lens array and said fiber alignment module, said detector array having an array of apertures respectively in alignment with said fibers in said fiber array to transmit light from said fibers, respectively, and position-sensitive detectors each of which is situated around a respective aperture to measure a lateral position of each beam passing through said respective aperture.

21. The device as in claim 20, further comprising a first spacer engaged between said detector array and said lens array, and a second spacer engaged between said detector array and said fiber alignment module, wherein said first spacer has alignment features formed on a surface in contact with said lens array to assist relative alignment between said lens array and said detector array, and said second spacer has alignment features formed on a surface in contact with said fiber alignment module to assist relative alignment between said detector array and said fiber alignment module.

22. The device as in claim 20, further comprising a second set of fibers, a second fiber alignment module having a second alignment plate with through holes to hold said second set of fibers in an array, a second lens array to collimate light from said second set of fibers, and a second position sensitive detector array located between said second lens array and said second fiber alignment module, wherein said second detector array has an array of apertures respectively in alignment with said second set of fibers to transmit light from said second set of fibers, respectively, and wherein each position sensitive detector is situated around a respective aperture to measure a lateral position of each beam passing through said respective aperture.

23. A device, comprising:

a plurality of fibers to guide light;

a fiber alignment module having an alignment plate with an array of fiber-holding through holes to hold said fibers in desired positions and in parallel to form a fiber array;

an optical processing module located in a path of said light to process light and to direct light to or receive light from said fiber array; and a lens array located between and engaged to said fiber alignment module and said optical processing module, said lens array having a plurality of lenses formed in a single substrate to collimate light from said fibers in said fiber array and to focus light to said fibers in said fiber array;

wherein said fiber alignment module comprises another alignment plate, each alignment plate having an array of through holes to respectively hold said fibers, each through hole configured to include a cylindrical neck portion that is approximately of the same dimension as the fiber to define a position of the fiber and a tapered funnel portion whose dimension is greater than the fiber to assist insertion of the fiber; and a spacer plate engaged between said alignment plates.

24. The device as in claim 23, wherein said alignment plates and said spacer plate are engaged to one another by glass bonding.

25. The device as in claim 23, wherein said alignment plates and said spacer plate are engaged to one another by glue bonding.

26. The device as in claim 23, wherein said spacer plate, said alignment plates have additional alignment through holes aligned to one another, and said device further comprising a pin inserted in said alignment through holes to assist alignment of said spacer plate and said alignment plates with respect to one another.

27. A device, comprising:

a plurality of fibers to guide light;

a fiber alignment module having an alignment plate with an array of fiber-holding through holes to hold said fibers in desired positions and in parallel to form a fiber array;

an optical processing module located in a path of said light to process light and to direct light to or receive light from said fiber array;

a lens array located between and engaged to said fiber alignment module and said optical processing module, said lens array having a plurality of lenses formed in a single substrate to collimate light from said fibers in said fiber array and to focus light to said fibers in said fiber array;

an optical beam splitter positioned to intercept and split fraction of optical beams to said fiber array to produce an array of monitoring beams; and an array of position-sensitive detectors positioned to receive said array of monitoring beams to monitor a relative position of each beam with respect to a corresponding fiber in said fiber array.

28. The device as in claim 27, wherein each position-sensitive detector includes a quadrant or bilateral detector.

29. A device, comprising:

a plurality of fibers to guide light;

a fiber alignment module having an alignment plate with an array of fiber-holding through holes to hold said fibers in desired positions and in parallel to form a fiber array;

an optical processing module located in a path of said light to process light and to direct light to or receive light from said fiber array;

a lens array located between and engaged to said fiber alignment module and said optical processing module, said lens array having a plurality of lenses formed in a single substrate to collimate light from said fibers in said fiber array and to focus light to said fibers in said fiber array; and an array of position-sensitive detectors respectively located at end facets of said fibers in said fiber array, wherein each position-sensitive detector is configured to surround a corresponding fiber to allow transmission of a beam of light to or from said fiber and to receive and detect peripheral portion of said beam outside said fiber to monitor a relative position of said beam with respect to said fiber.

30. A device, comprising:

a plurality of fibers to guide light;

a fiber alignment module having an alignment plate with an array of fiber-holding through holes to hold said fibers in desired positions and in parallel to form a fiber array;

an optical processing module located in a path of said light to process light and to direct light to or receive light from said fiber array; and a lens array located between and engaged to said fiber alignment module and said optical processing module, said lens array having a plurality of lenses formed in a single substrate to collimate light from said fibers in said fiber array and to focus light to said fibers in said fiber array;

wherein said lens array is engaged to an opening in said optical processing module to form a hermetical seal.

* * * * *